United States Patent [19]

Kuo et al.

[11] 4,074,179
[45] Feb. 14, 1978

[54] POSITION DETECTION METHODS AND APPARATUS FOR STEPPING MOTORS

[75] Inventors: Benjamin C. Kuo; John R. Frus, both of Champaign; Gurdial Singh, Urbana, all of Ill.

[73] Assignee: Warner Electric Brake & Clutch Company, Rockford, Ill.

[21] Appl. No.: 587,107

[22] Filed: June 16, 1975

[51] Int. Cl.² ............................................ H02K 37/00
[52] U.S. Cl. ................................................... 318/696
[58] Field of Search ................ 318/138, 332, 685, 696

[56] References Cited

U.S. PATENT DOCUMENTS

| | | | |
|---|---|---|---|
| 3,304,481 | 2/1967 | Saussele | 318/138 |
| 3,329,852 | 7/1967 | Saussele et al. | 318/138 |
| 3,611,081 | 10/1971 | Watson | 318/138 |
| 3,727,121 | 4/1973 | Rich | 318/685 |
| 3,746,959 | 7/1973 | Kobayashi et al. | 318/696 |
| 3,767,993 | 10/1973 | Yablonski | 318/685 |
| 3,812,413 | 5/1974 | Keidl | 318/696 |

*Primary Examiner*—Gene Z. Rubinson
*Attorney, Agent, or Firm*—Leydig, Voit, Osann, Mayer & Holt, Ltd.

[57] ABSTRACT

Apparatus and controls for indicating the position of a stepping motor rotor as it successively steps and without the need for physically driven encoders or pulse generators, characterized by arrangements for sensing the current, or the rate of change of current, flowing in the motor windings. The intelligence indicating when the rotor reaches successive positions is applied advantageously to a utilization device such as a counter to signal the position of a driven load, and is used to control sequenced energization of the motor windings to create the advantages of a closed loop system but without a driven feedback device.

55 Claims, 26 Drawing Figures

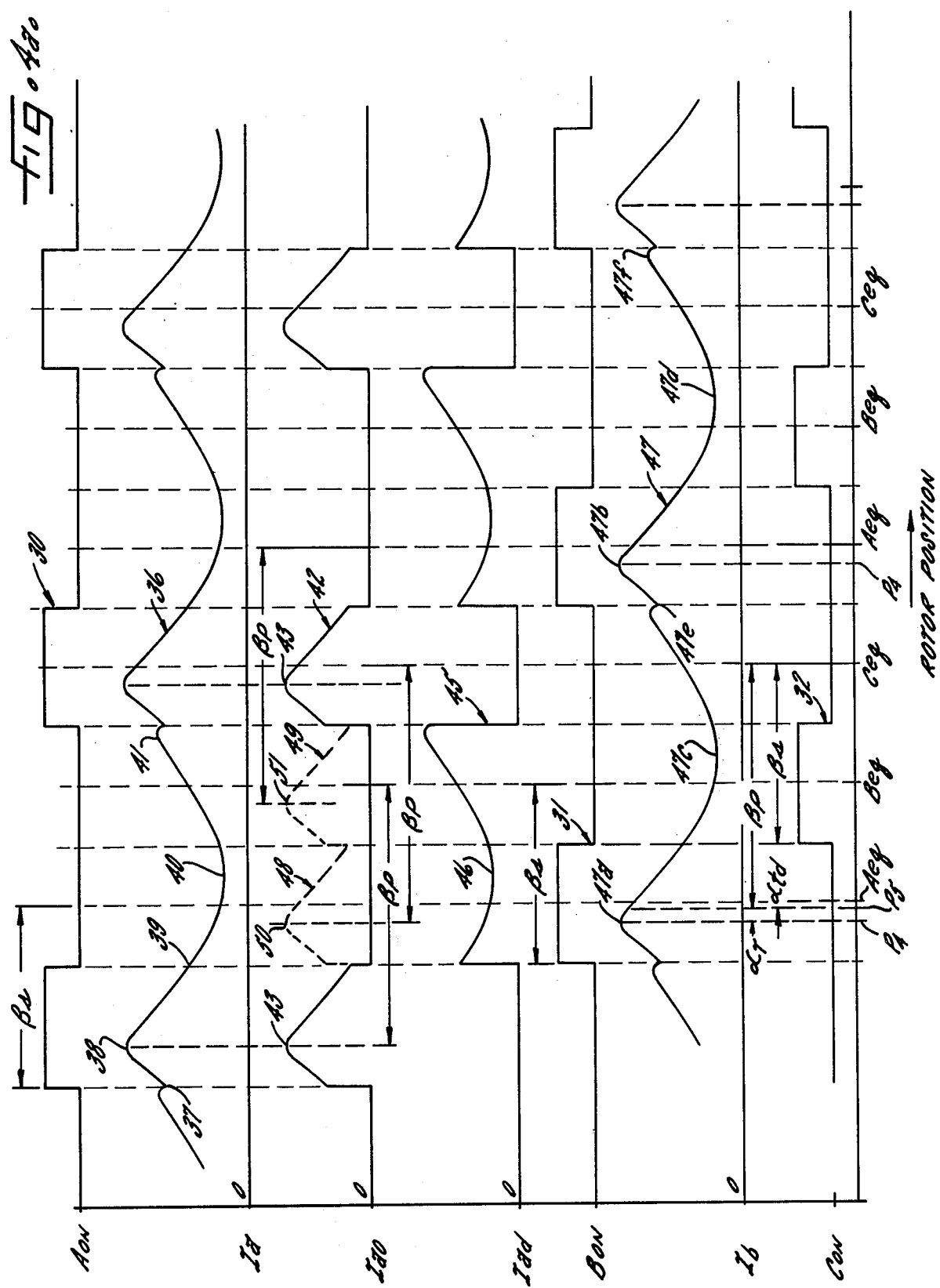

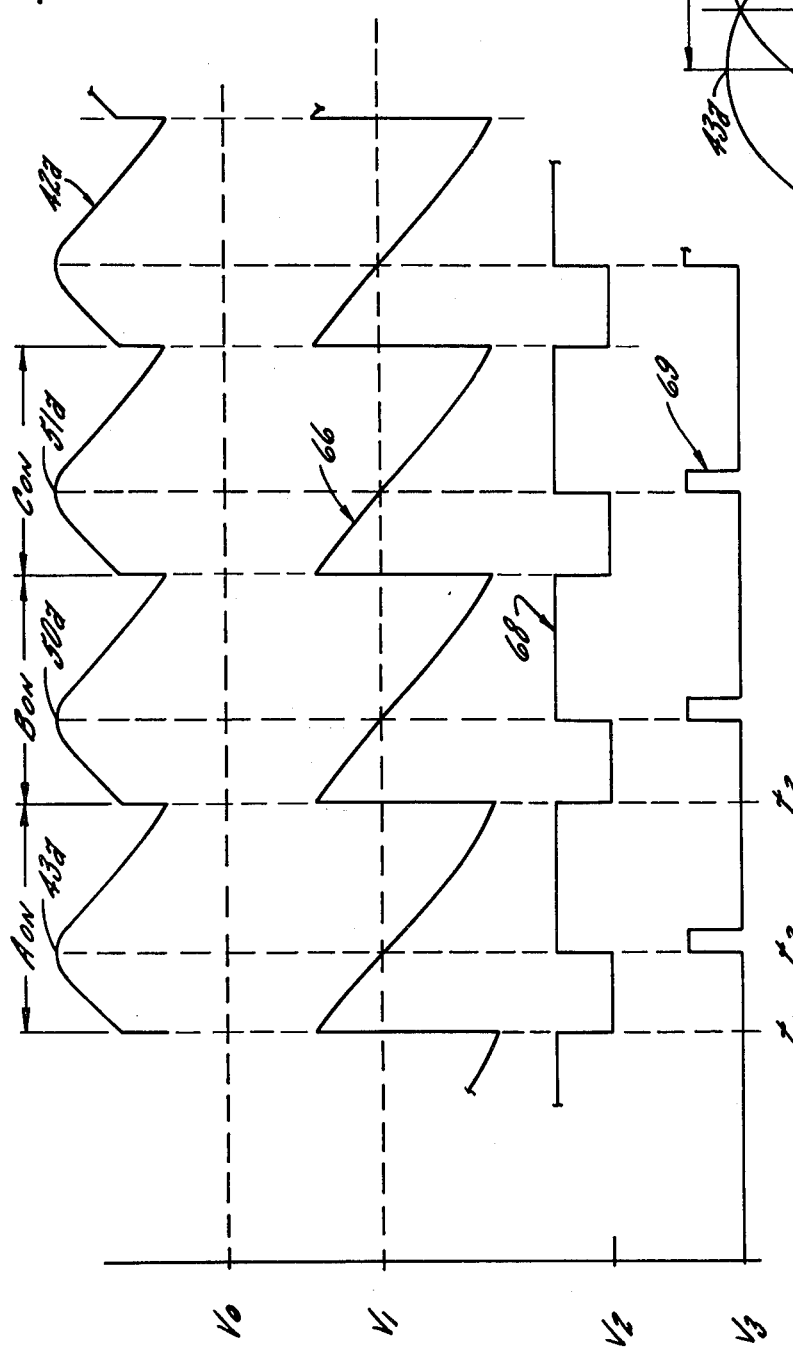
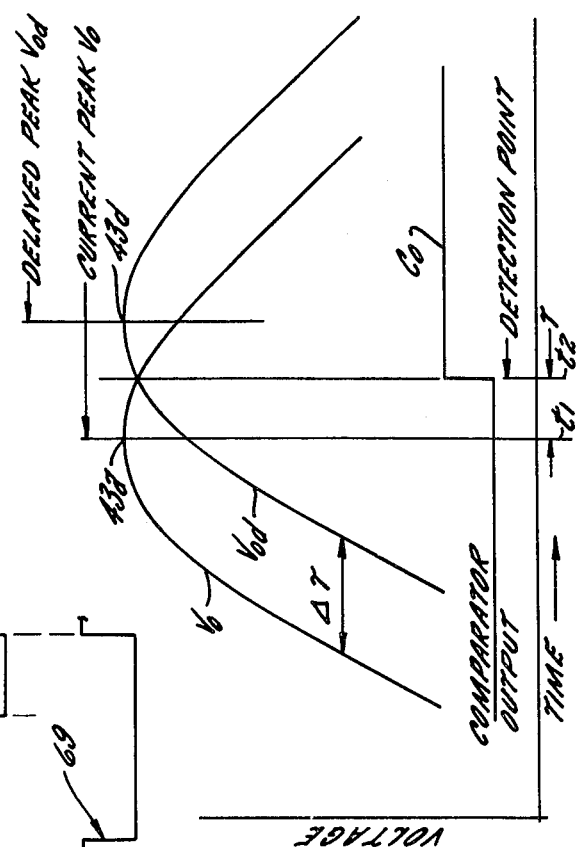

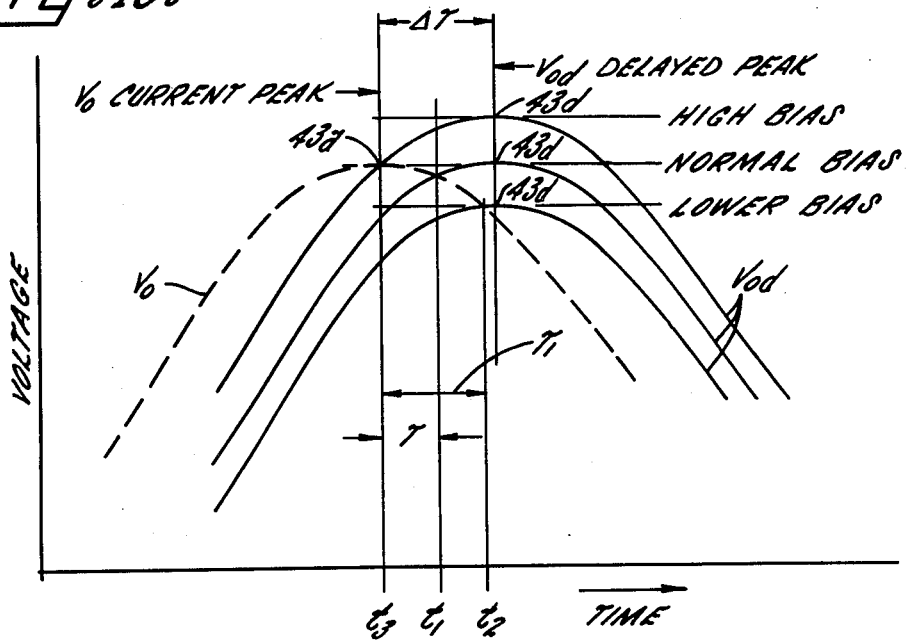
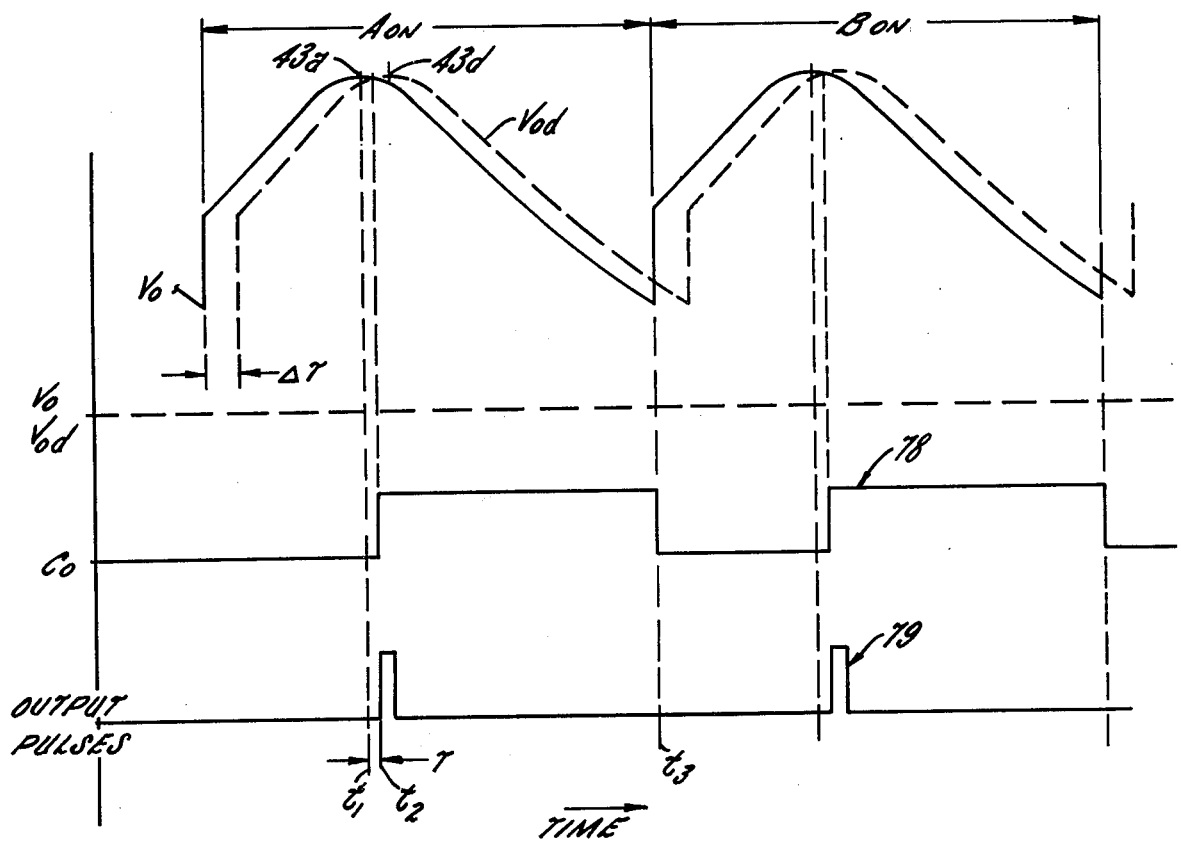

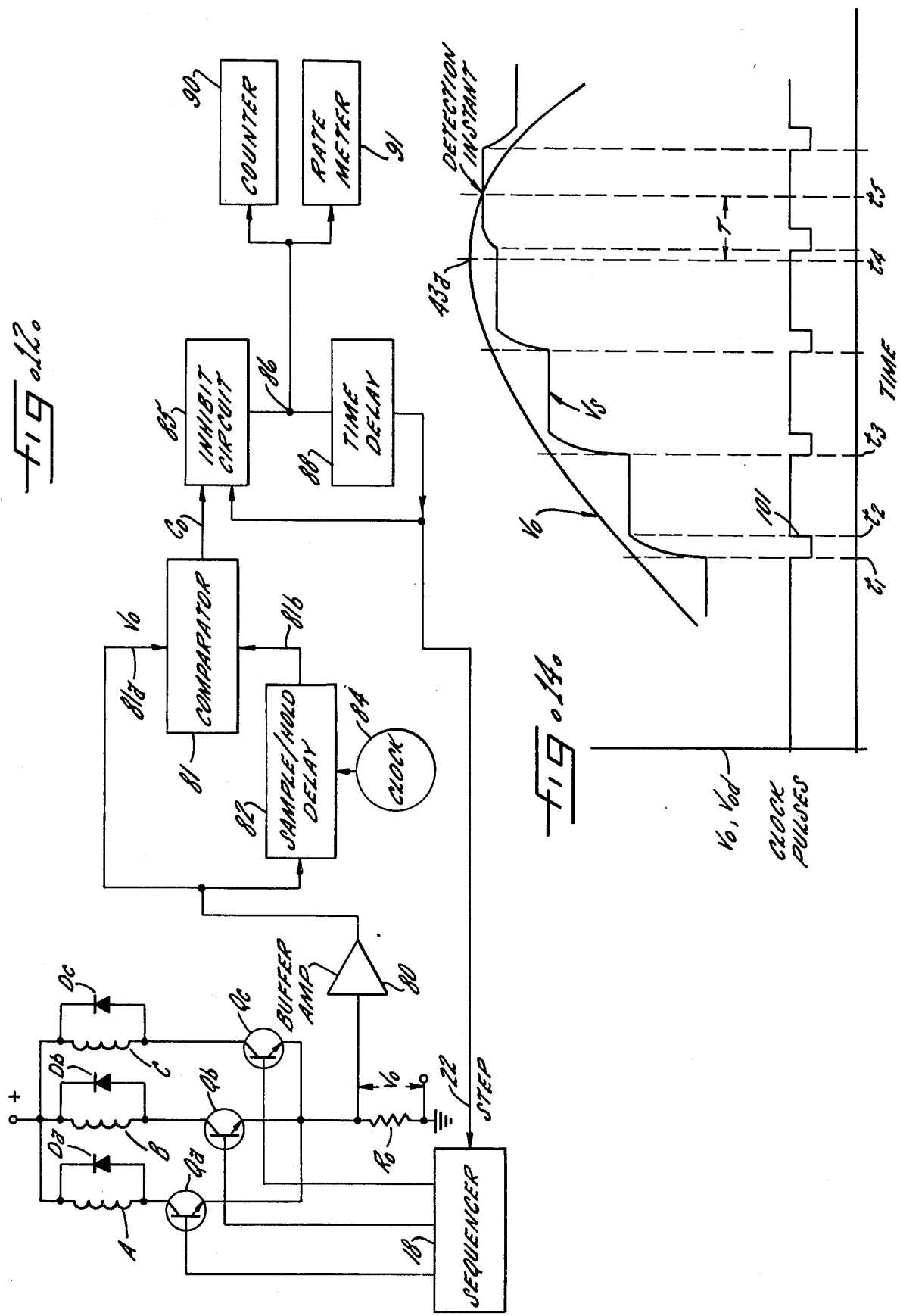

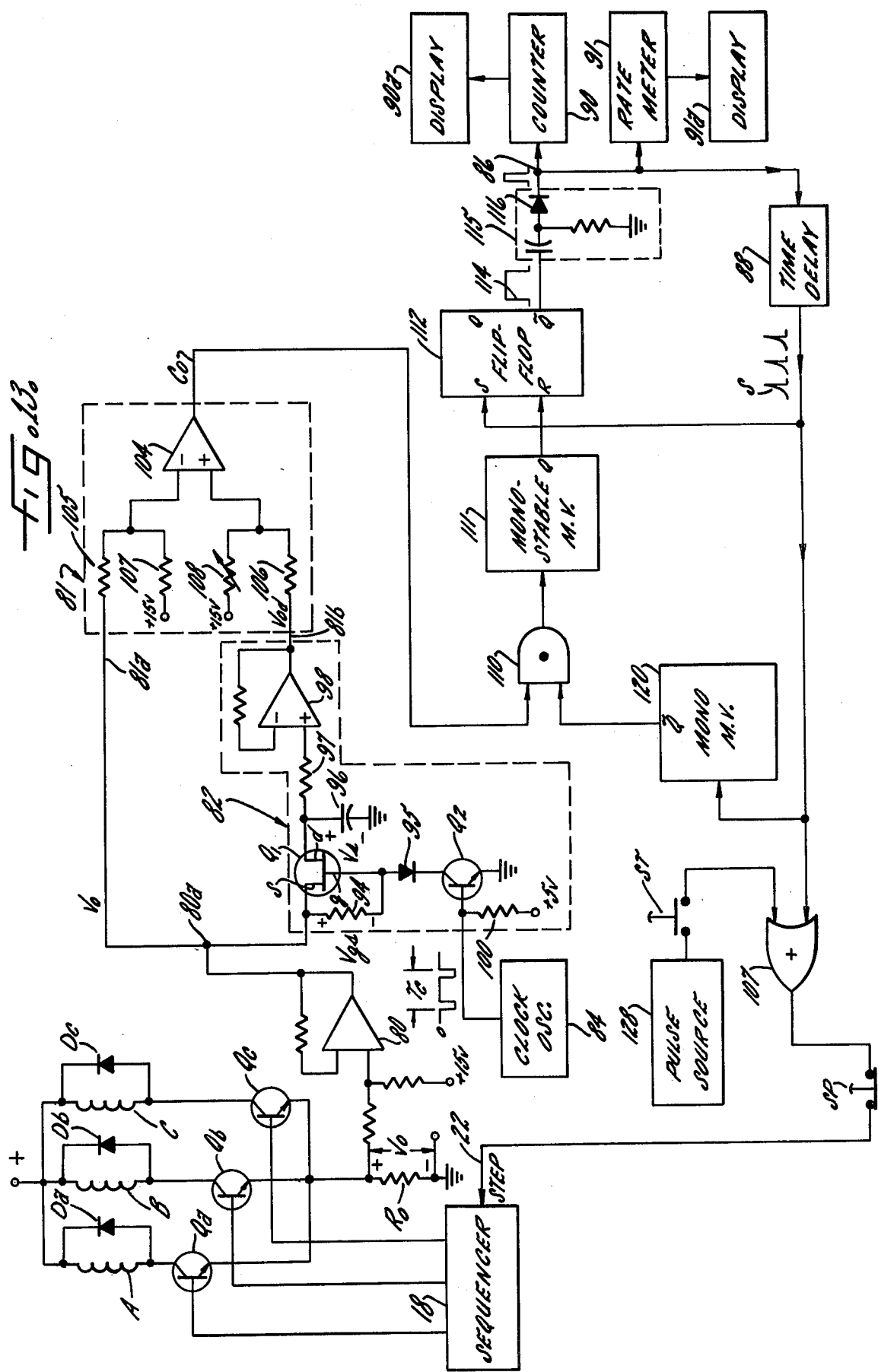

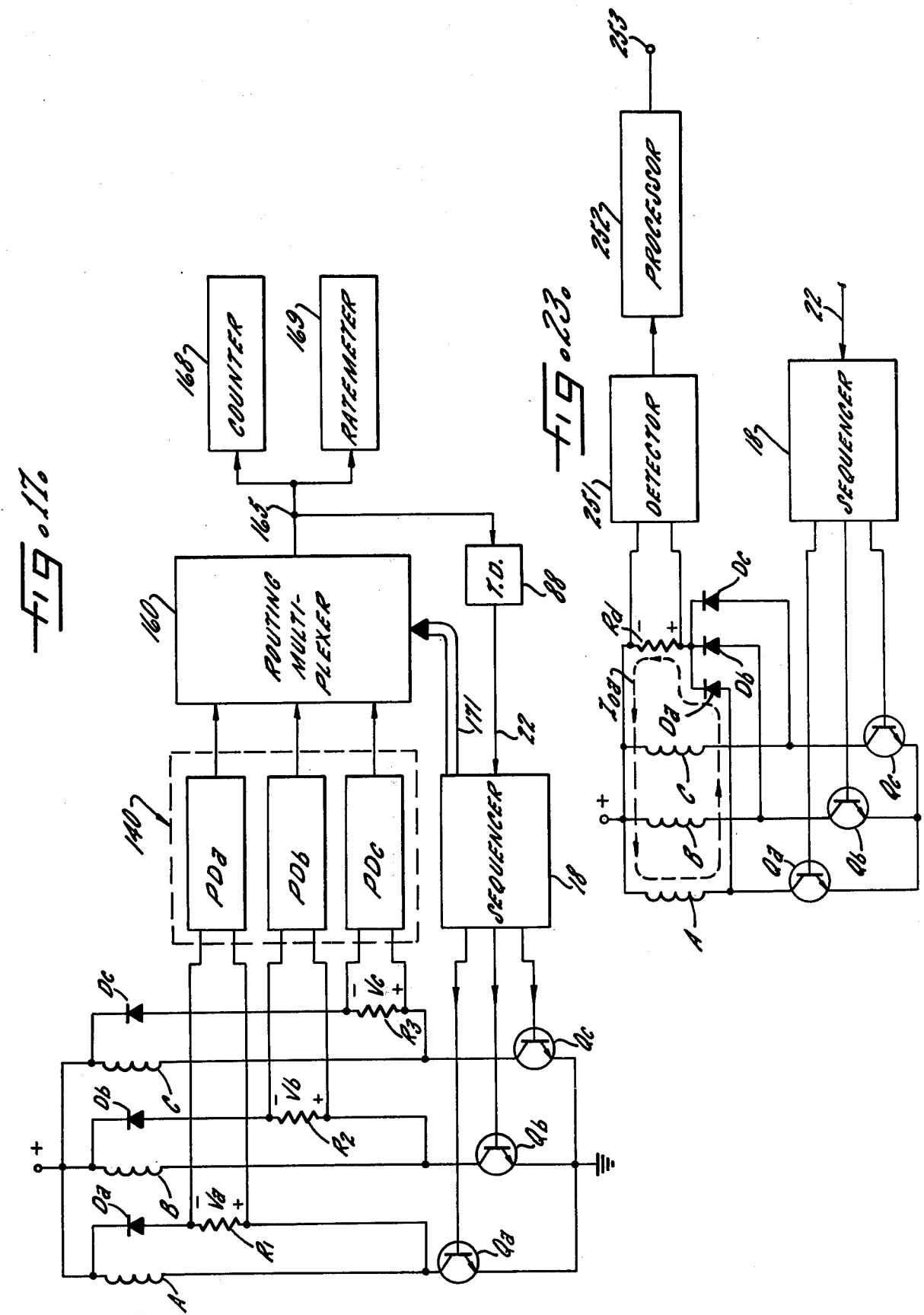

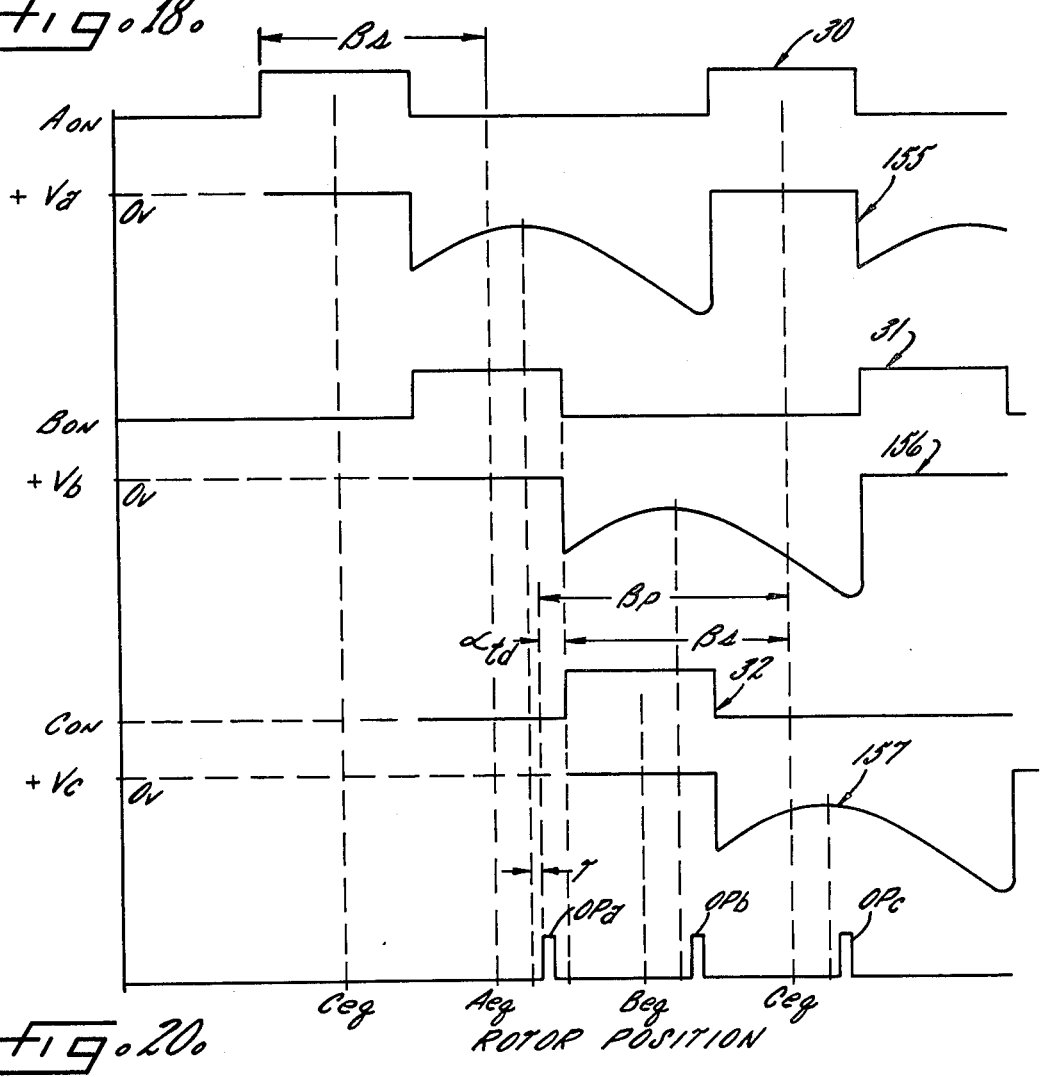
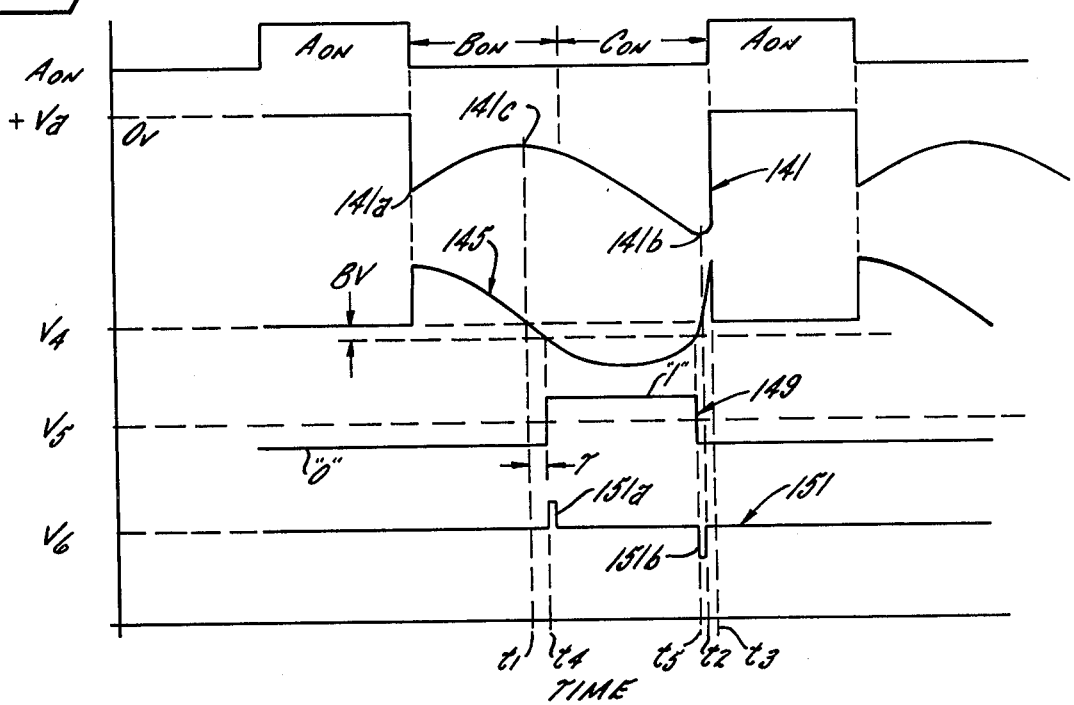

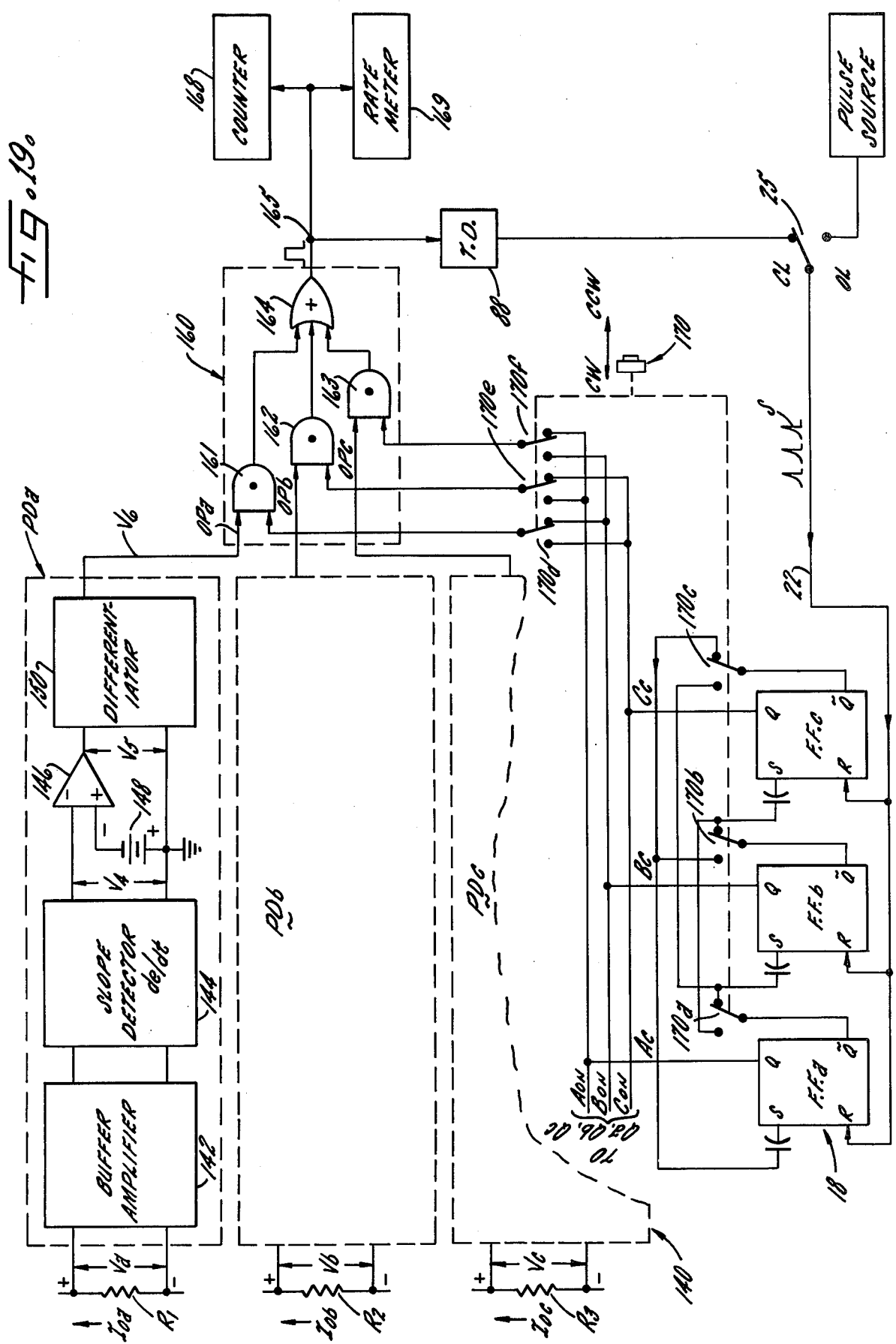

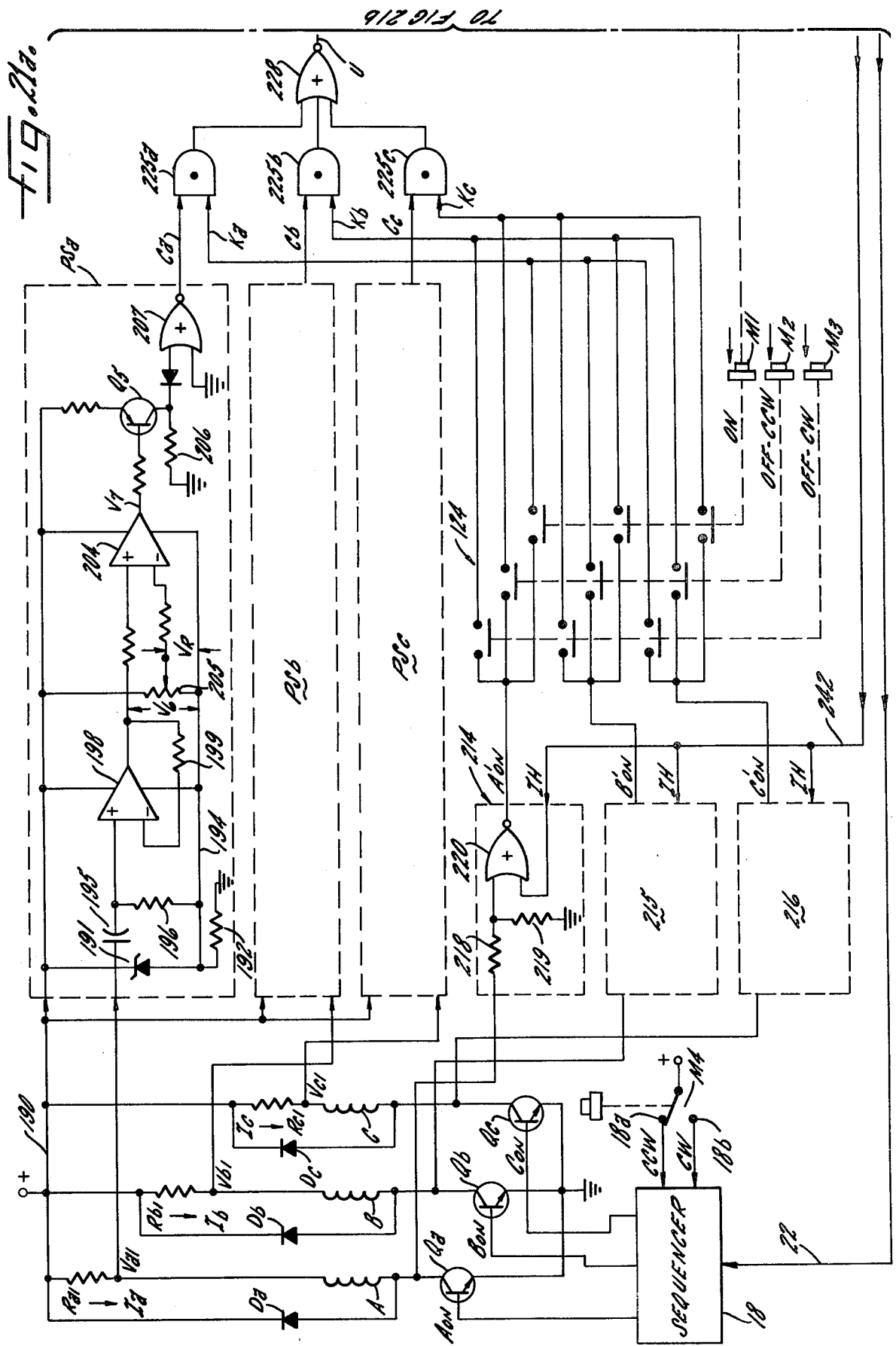

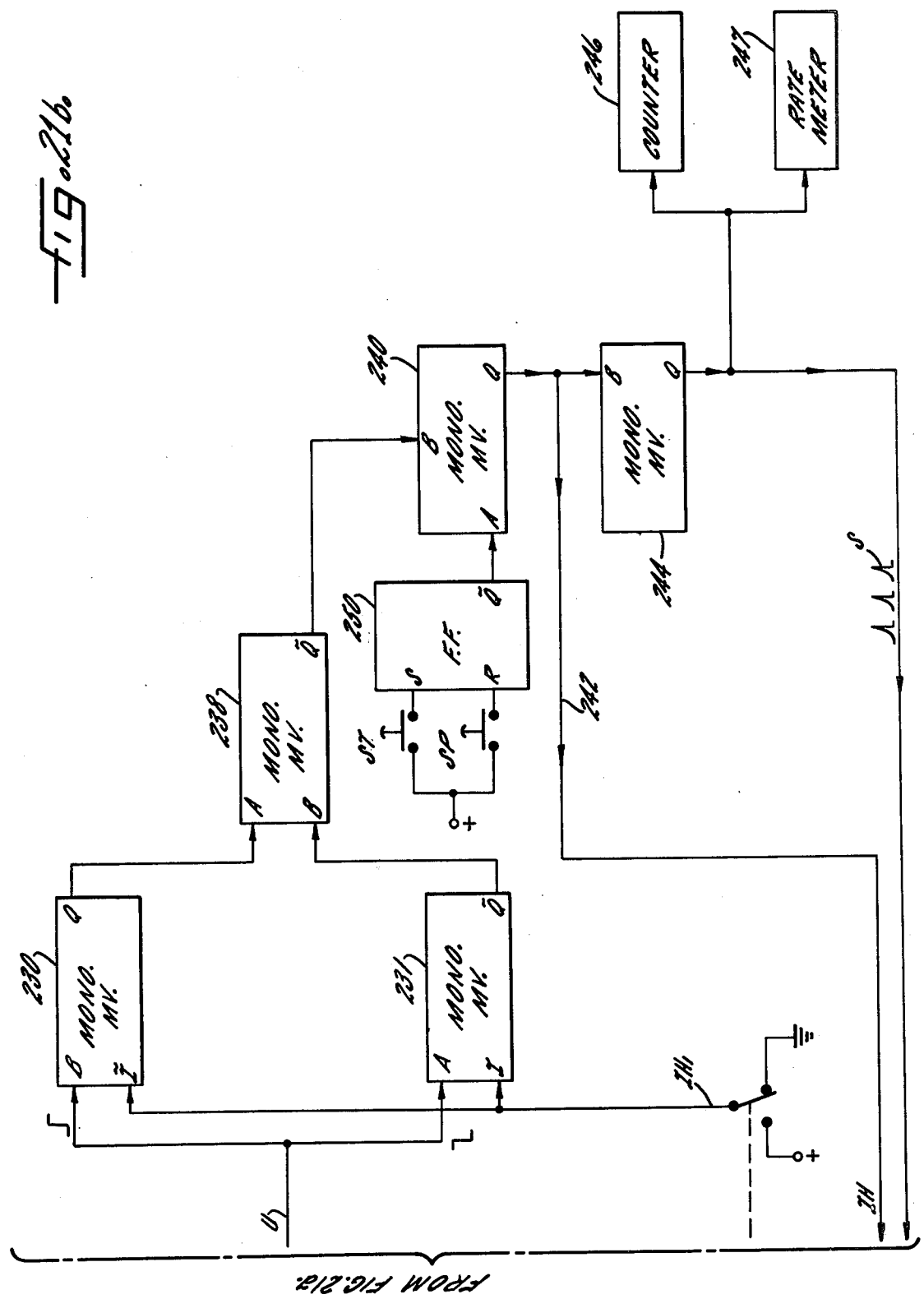

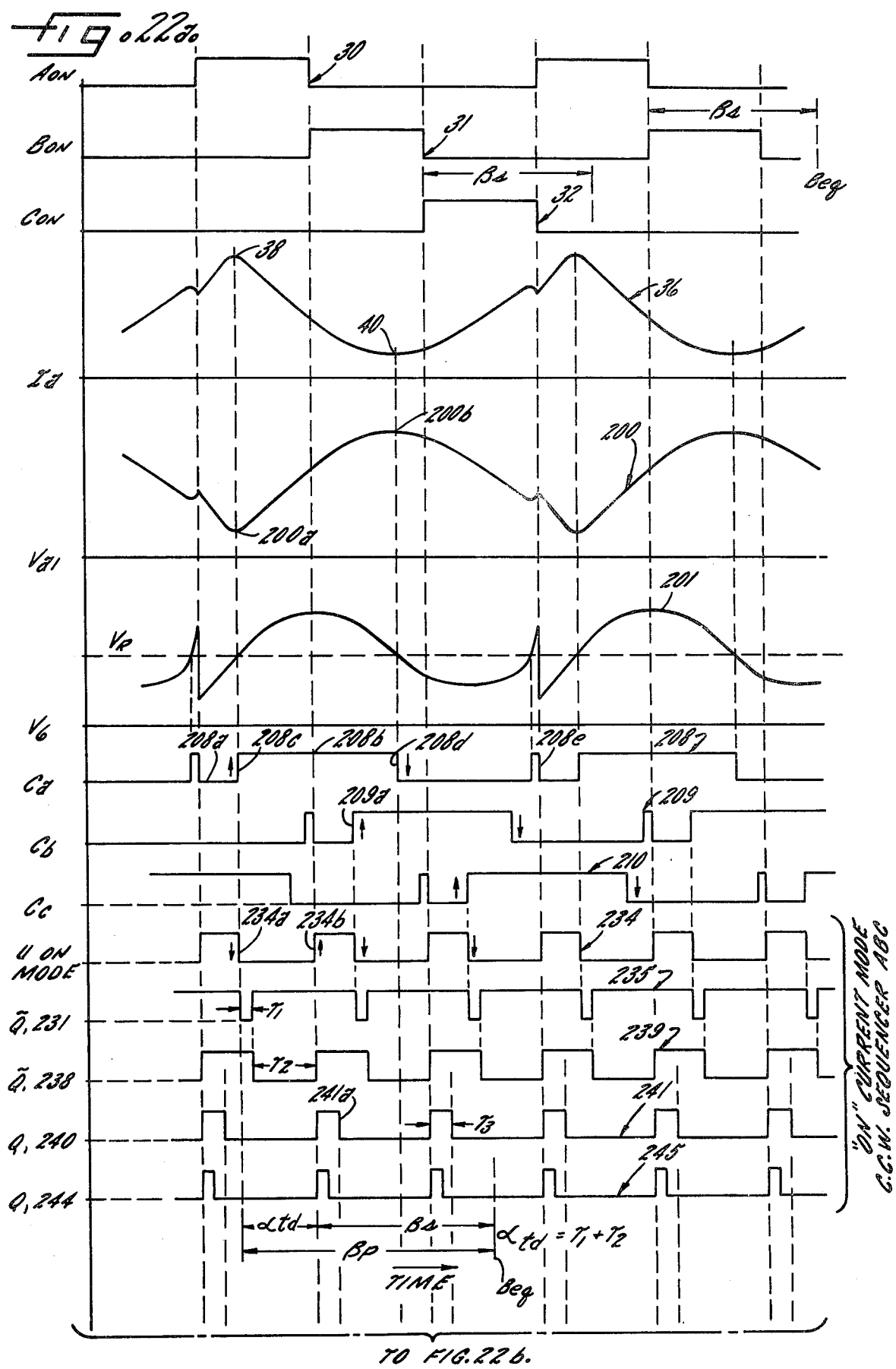

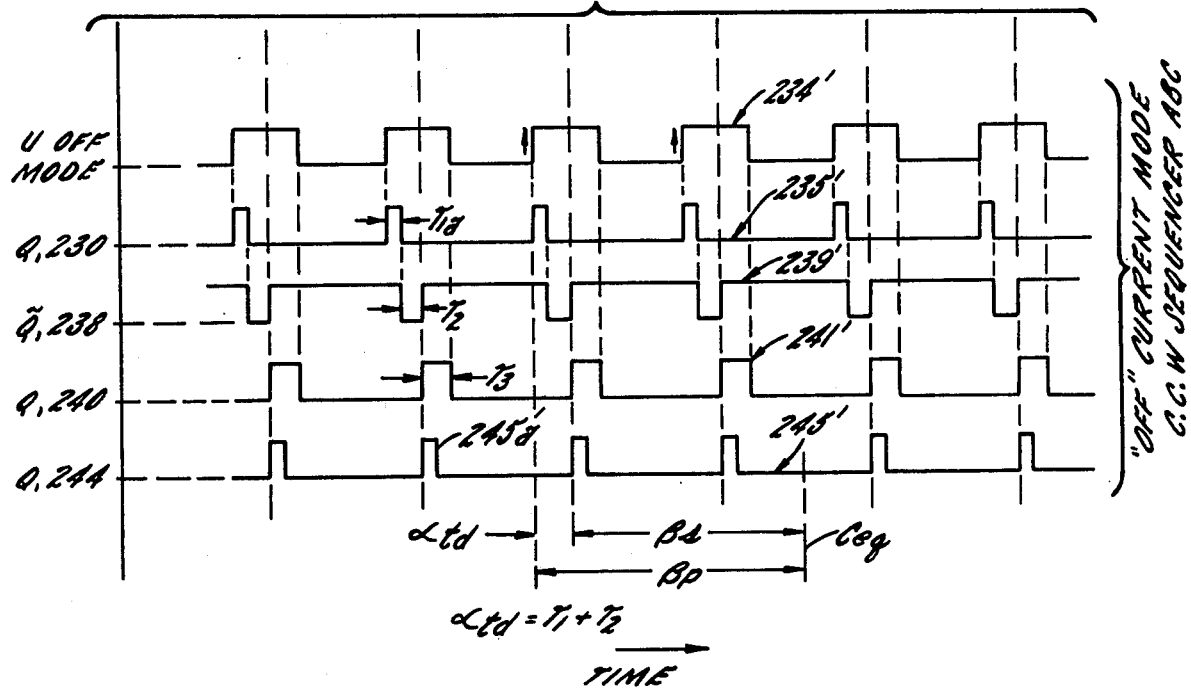

4,074,179

POSITION DETECTION METHODS AND APPARATUS FOR STEPPING MOTORS

BRIEF SUMMARY OF THE INVENTION

The present invention relates in general to stepping motors and in particular to methods and apparatus for signaling when the rotor reaches successive predetermined locations. In one aspect, the invention pertains to the controlling of a stepping motor such that each step is initiated in response to confirmation that the preceding step has been or will be consummated.

It is the general aim of the invention to provide methods and apparatus by which the attainment of successive rotor locations, or the execution of a step, in a stepping motor is confirmed solely from the direct or indirect sensing of currents which flow in the motor windings.

A related and important object of the invention is predicated upon the discovery that currents through the winding phases of a step motor will exhibit waveforms which recur during successive stepping actions, and that detection of a predetermined characteristic (e.g., magnitude, threshold of slope, slope flexure, or slope reversal) may indicate rotor position within successive step cycles. A specific objective resides in the creation of step-confirming signals by detecting peaks in the sensed currents. The peaks may be either maxima or minima in the current waveforms.

Still another object of the invention is to provide a stepping motor control system which, for all intents and purposes, has the same advantages of closed loop operation with a motor-driven encoder or feedback pulse generator, and which requires no physically driven component, but on the contrary requires only non-moving electrical circuit components. A coordinate object is to provide a quasi-closed loop control system for a stepping motor wherein static feedback elements may be located at or near the conventional sequencing pulse driver and remotely from the physical location of the motor itself and any adverse environmental conditions at such locations.

Another object is to provide apparatus for detecting high or low peaks in stepping motor currents with high reliability by comparison of the original and a delayed counterpart of a currentrepresenting waveform.

An additional object is to provide apparatus and methods by which the total displacement (position) and/or the average speed (velocity) of a load driven by a stepping motor may be accurately signaled — yet without any mechanically driven signaling device such as an optical encoder.

Yet another object is to bring forth methods and apparatus by which either the currents through excited winding phases of a step motor, or the dissipation flyback and induced currents in non-excited winding phases, are sensed in order to produce accurate positionattainment signals for application to a utilization device.

DESCRIPTION OF THE DRAWING FIGURES

Other object and advantages of the invention will become apparent from the following detailed description, taken in conjunction with the accompanying drawings, in which:

FIG. 4a is a series of graphs illustrating the relationships of phase excitation voltages and phase currents to rotor positions;

FIG. 6 is a circuit diagram showing details of an analog peak detector which is represented in block form by FIG. 5;

FIG. 7 is a series of waveforms plotted against time to illustrate the operation of the peak detector in FIG. 6;

FIG. 9 is a graphical representation of certain signals or waveforms as they will be created during operation of the apparatus shown in FIG. 8;

FIG. 10 is a graphical illustration of the effects produced by adjusting a bias voltage in the system of FIG. 8;

FIG. 11 illustrates signals or waveforms as they will appear during the operation of the apparatus shown by FIG. 8;

FIG. 12 is a schematic and block diagram showing another embodiment of the present invention including a preferred peak detector and typical utilization devices;

FIG. 13 is a counterpart of FIG. 12 showing more particularly the details of certain components;

FIG. 14 is a timing chart illustrating the variation of certain signals produced in the peak detector of FIG. 13;

FIG. 17 is a generalized block diagram of still another embodiment of the invention which operates by detecting the peaks of phase currents flowing during the off or flyback dissipation intervals for the stepping motor windings.

FIG. 18 shows graphically the relationships between rotor position and certain voltages and currents in the apparatus of FIG. 17 when operating at a steady state stepping speed;

FIG. 19 is a more detailed illustration of the apparatus which is designated generally in block form by FIG. 17;

FIG. 20 is a timing chart graphically illustrating the variations in certain voltages and currents during operation of the apparatus shown in FIG. 19;

Figure 4:
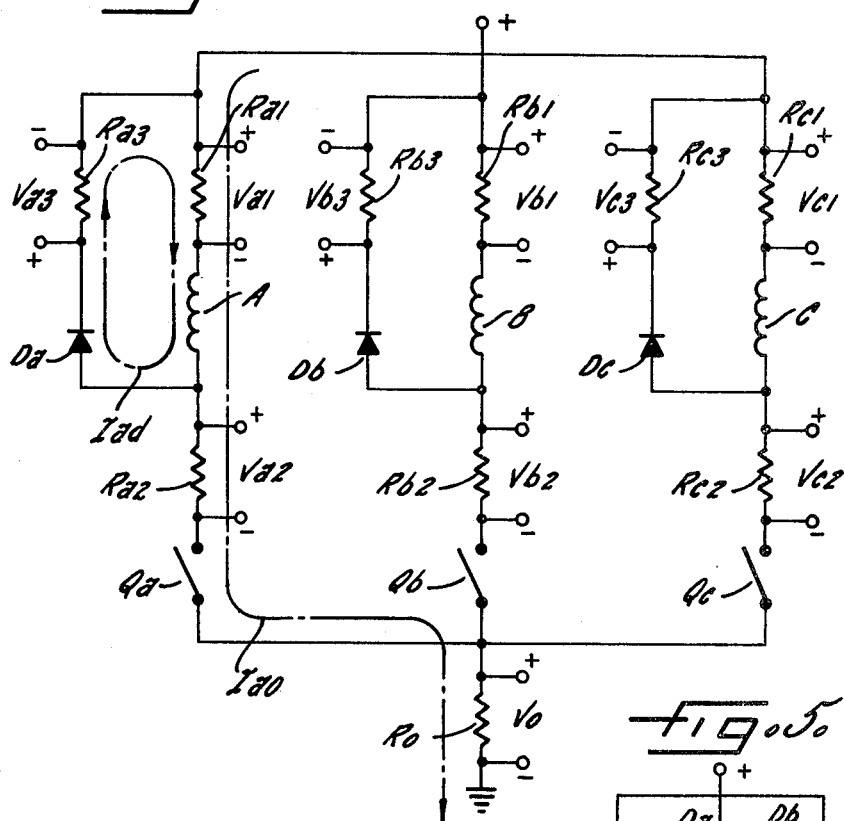
FIG. 4 is a simplified schematic diagram to illustrate what are here called "on" and "off" phase currents.

FIG. 21 (formed by joining FIGS. 21a and 21b) is a schematic block diagram of another embodiment of the invention, characterized in that quasi-closed loop control of the stepping motor may selectively be operated in either an "on current" or an "off current" peak sensing mode, and in either a c.c.w. or a c.w. direction;

FIG. 22 (formed by joining FIGS. 22a and 22b) is a series of timing graphs which illustrate the operation of the apparatus shown in FIG. 21; and FIG. 23 is an illustration of still another arrangement for sensing "off currents" which is not indicated by the generalized illustration in FIG. 4.

While the invention has been shown and will be described in some detail with reference to particular embodiments thereof, there is no intention that it thus be limited to such detail. On the contrary, it is intended here to cover all modifications, alternatives and equivalents falling within the spirit and scope of the invention as defined by the appended claims.

Detailed Description

Figure 1:
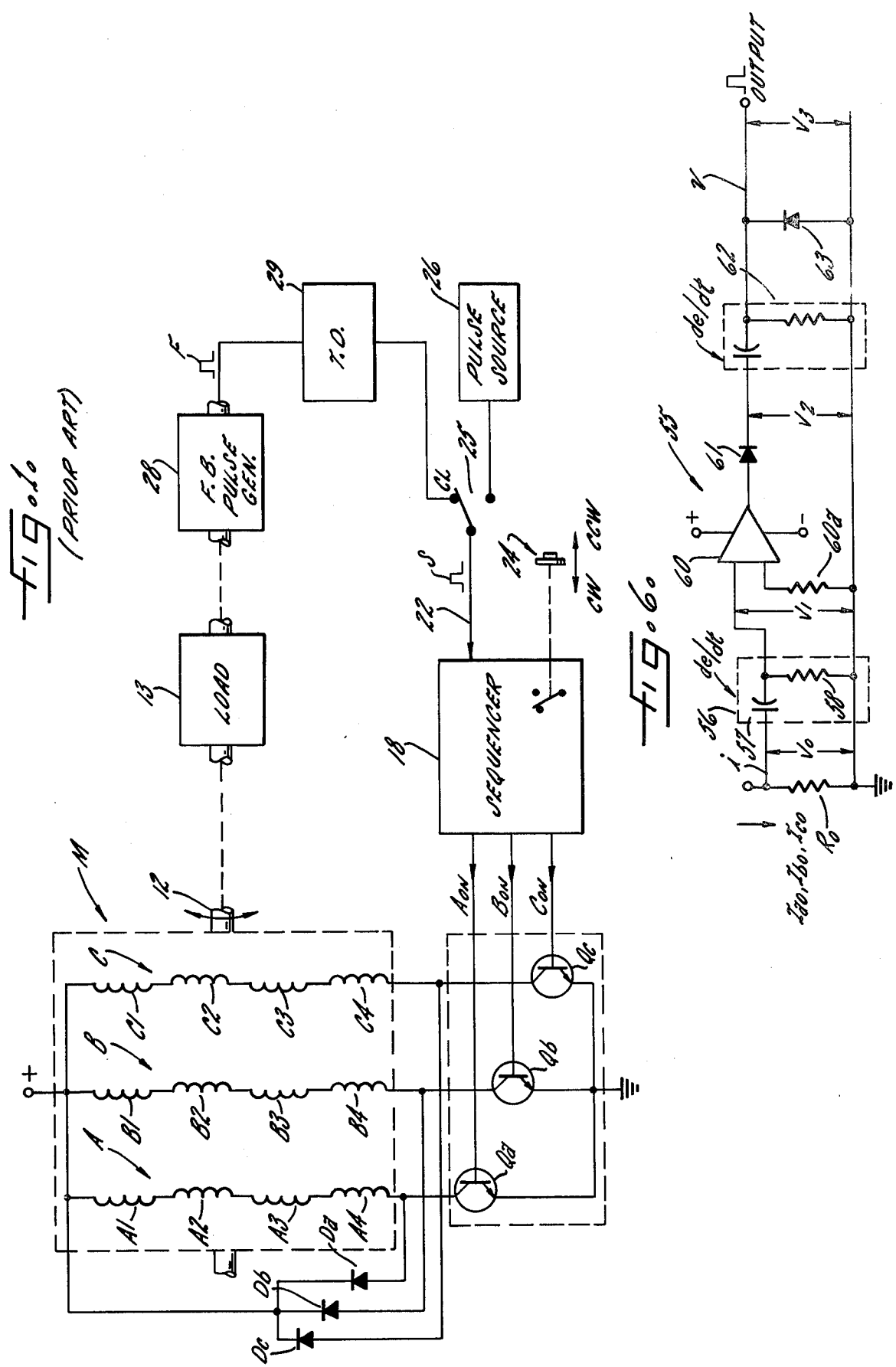
FIG. 1 is a diagrammatic representation of an exemplary stepping motor and control system organized according to known prior art.
Figure 2:
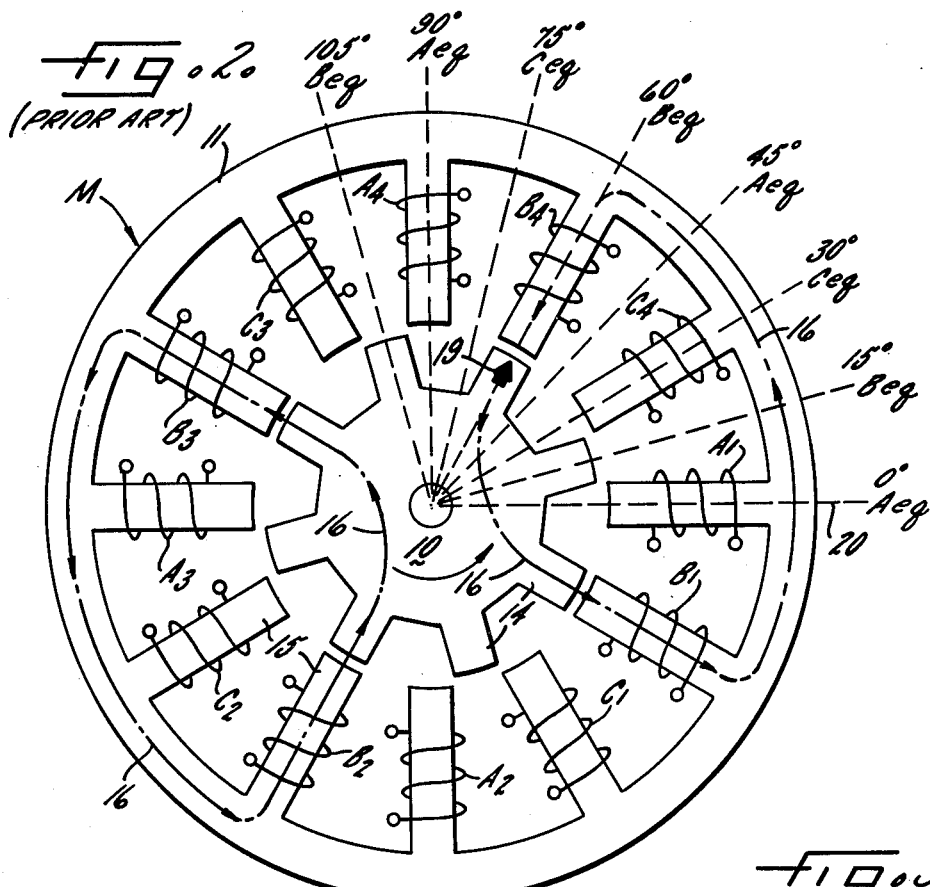
FIG. 2 is a cross sectional illustration of an exemplary stepping motor.

By way of reviewing known prior art practices, it may be noted from FIGS. 1 and 2 that an exemplary step motor M includes a rotor 10 journaled in a stator 11 and having an output shaft 12 which may be coupled in conventional fashion to drive a rotatable load 13. The rotor is formed with circumferentially spaced teeth 14 (here shown, for example, as eight in number) which lie radially opposite salient, inwardly projecting pole pieces 15 (here, for example, twelve) formed on or carried by the stator with equal circumferential spacing. Each pole piece connects with the outer ring of the laminated stator which forms a return path for magnetic flux 16, represented by dashed lines in FIG. 2 as it will exist when windings B1–B4 are excited with current.

The stator pole pieces support twelve respective windings A1–A4, B1–B4, C1–C4, in the illustrated example. They are so designated because in conventional fashion there are a plurality of the windings grouped together in series or parallel for simultaneous excitation and de-excitation by power switching devices, each group commonly being called a "phase". As indicated in the exemplary arrangement of FIG. 1, the windings A1–A4 are connected in series to form a winding phase A, and the windings B1–B4 and C1–C4 are serially connected to create phases B and C.

In common practice, each phase is connected to or disconnected from a suitable dc. voltage source (designated by the + and ground terminals) by a power switch, the latter being illustrated as switching transistors $Q_a$, $Q_b$, $Q_c$ in FIG. 1. These power transistors are turned on one at a time in sequence by a sequencer 18 which supplies positive control voltages $A_{on}$, $B_{on}$, $C_{on}$ to their respective bases, thereby rendering the normally cut-off collector-emitter paths individually fully conductive. In the parlance of the trade, the transistors $Q_a$, $Q_b$, $Q_c$ are sequentially "turned on" to turn the corresponding phases on in sequence, so as to make the rotor 10 step successively from one position to the next.

The simple and typical stepping motor here illustrated has twelve poles and eight rotor teeth. If the B phase is steadily held excited, magnetic flux exists in two paths as represented at 16 in FIG. 2, thereby causing rotor teeth to line up with those poles supporting B phase windings. The rotor teeth move to a position which creates minimum reluctance to the magnetic flux produced by the excited windings. The illustrated position is called one of the "B equilibrium" positions of the rotor. If an imaginary arrow 19 on the rotor is taken as representing the angular position of the rotor relative to a zero reference position 20 on the stator, the rotor is seen in FIG. 2 to rest at 60° equilibrium position.

Now if the B phase is turned off and the C phase is excited, the rotor will be attracted and moved counterclockwise until the next-closest teeth aline with the C phase poles. The arrow 19 will step to the 75° C equilibrium position. If the A phase is next excited, the rotor will advance c.c.w. to the 90° A equilibrium position. Thus, with each slow sequential change in phase excitation in A, B, C order the rotor 10 will "step" a predetermined increment of 15° to the next equilibrium position which is established by the angular tooth spacing and pole spacing. On the other hand, if the phases are excited in a slow B, A, C sequence, the rotor will step successively clockwise through angular increments of 15°. When the motor phases are excited in rapid succession, however, the rotor does not come to a full stop at each equilibrium position; and as it approaches one such position, the phases are switched to keep it moving.

The specific numbers of teeth, pole pieces and phases here shown are merely for an example which will aid in subsequent description. Clearly other particular step motor configurations, including those of the permanent magnet type — as contrasted with the illustrated variable reluctance type — may be employed. Moreover, the phases may, especially where an even number of phases are used, be excited in a sequence such that two phases are always on.

For control of the motor M, the sequencer 18 responds to each of successive "switching" command pulses applied to an input line 22 so as to switch the power transistors $Q_a$, $Q_b$, $Q_c$ on in sequence. The sequencer is also controlled by either a selector switch or a logic control voltage applied thereto so that it causes the phases to be energized in an ABC or CBA sequence to step the motor rotor in either a counterclockwise or clockwise direction. Such a selector switch 24 is illustrated in FIG. 1.

Each time that one of the power switches $Q_a$, $Q_b$ or $Q_c$ is rendered conductive, excitation current flows from the positive terminal of the voltage source through the associated winding phase A, B or C to the negative terminal of that source, here illustrated as ground. When that power switching transistor is thereafter cut off, the effect of the phase winding inductance tends to keep the excitation current flowing in the same direction. It is a known and standard practice to connect dissipation elements in parallel with each phase in order to conduct "inductive flyback" current and quickly dissipate the energy in magnetic flux created by the excited windings. Although the flyback dissipation elements may in some cases be resistors or the like, it is the preferred practice to connect diodes across the respective phases, as shown by the diodes $D_a$, $D_b$, $D_c$ in FIG. 1. These diodes are poled such that they do not significantly conduct current from the voltage source when the associated power switch transistors are turned on, but such that they create a low resistance current path for flyback current which is produced by the inductive kick voltage across an excited phase immediately after it is turned off. In other words, the flyback diodes $D_a$, $D_b$, $D_c$ here shown are respectively in parallel with the phases A, B and C and have their cathodes connected to the positive terminal of the voltage source so that they conduct substantially only flyback current.

The stepping motor M in FIG. 1 may be operated in an open loop mode simply by connecting the switching pulse input line 22 via a selector switch 25 to a recurring pulse source 26. As each pulse is received from the source 26, the sequencer 18 switches the energized phase in the motor M, and the latter executes one step. Open loop control of a stepping motor suffers from the disadvantage that there is no way to determine or confirm if the motor properly responds to each switching pulse. The motor may fail to rotate due to an excessively high torque load, or it may perhaps step in the wrong direction. Reliable control of stepping speed, torque and total distances stepped in the open loop mode of operation is virtually impossible, particularly at higher stepping speeds.

The preferred and more common arrangement for controlling stepping motors has thus been the "closed loop" arrangement. This is depicted in FIG. 1 when the selector switch 25 is placed in its CL position so as to receive switching pulses originated in a feedback pulse generator (commonly called an encoder) 28. The feedback pulse generator is mechanically coupled to be driven by the motor output shaft 12 or the load 13 so that it rotates directly in step (or with a predetermined gear ratio) with the motor shaft. The encoder or pulse generator 28 translates mechanical motion into electrical signals which indicate the rotor position, i.e., confirm that the rotor has reached a certain position due to execution for a given step. Because the organization and operation of such encoders is known to those skilled in the art, the details are not here given. It will suffice to note simply that as the rotor reaches and passes through successive stepping positions, the feedback pulse generator produces one pulse per step.

These feedback pulses are routed through a time delay circuit 29 to introduce a delay which, at a given motor speed, corresponds to a given angular displacement of the rotor. Thereafter, the pulses are routed to the switching command line 22 so as to trigger the sequencer. The switching off of the energized phase (and turn-on of the next phase) in the motor M therefore occurs only when the step created by the energization of that phase has been, or will be, consummated.

Figure 3:
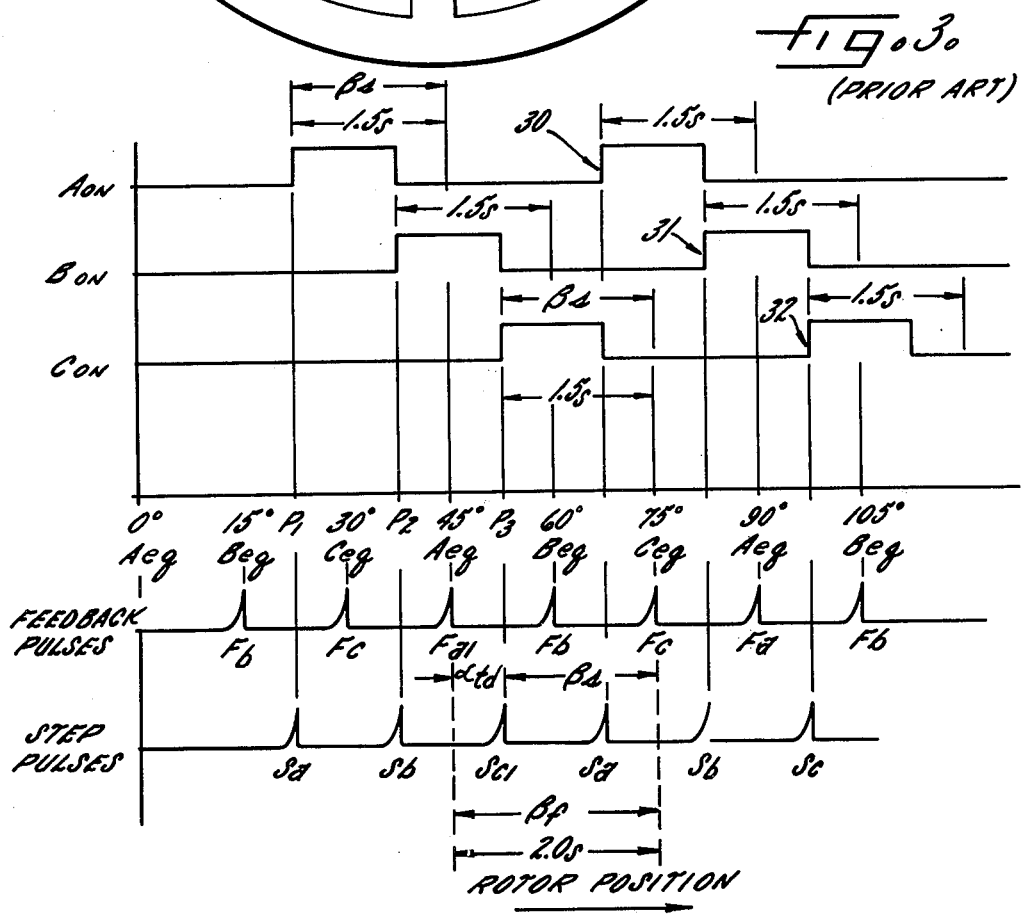
FIG. 3 is a series of graphic illustrations of signals as they appear in relation to the changing rotor position during the operation of the apparatus shown in FIG. 1.

By way of further background, it may be assumed that the system of FIG. 1 has been set into continuous stepping operation at a given speed in steps per second, and that the A, B, C phases are being sequentially turned on as represented by the squarewaves 30, 31, 32 in FIG. 3. The instants at which these excitation voltage pulses start and end must be related to the rotor position during operation at a given stepping speed. For example, prior to the rotor reaching the A equilibrium position $A_{eq}$ at 45°, the A phase must be turned on at that instant when the rotor occupies the angular position p1. Similarly, prior to the rotor reaching the position $B_{eq}$ at 60° the B phase must be turned on at that instant when the rotor is at the angular position p2. These "turn on" positions or instants must lead or anticipate the equilibrium positions for the phase to be turned on, and thus the angular distance from the position p1 to the next reference equilibrium position $A_{eq}$ is termed the "switching lead angle", here labeled $\beta_s$. Merely as an example for purposes of discussion, it is assumed that the switching lead angle $\beta_s$ at a given speed for the motor M is equal to 1.5 steps, and since one step for the motor shown in FIG. 2 is 15°, the switch lead angle $\beta_s$ is assumed and shown to be 22.5°.

In order to run the motor continuously, switching pulses $S_a$, $S_b$, $S_c$ as shown in FIG. 3 are sequentially applied to the input 22 of the sequencer 18. It is assumed that the latter is conditioned to produce a phase energization sequence of A, B, C so that the motor rotor steps successively in a counterclockwise direction. As indicated for the assumed conditions of FIG. 3, these switching pulses $S_a$, $S_b$, $S_c$ appear with timing such that they have a lead angle $\beta_s$ equal to 1.5 steps measured from the equilibrium position of the phase which is next to be excited. That is, the particular switching pulses labeled $S_{c1}$ (which triggers the sequencer 18 to turn off phase B and turn on phase C) appears displaced by the lead angle $\beta_s$ from the $C_{eq}$ position at 75°; and this turns on the phase C at the instant that the rotor passes through the 52.5° position.

If the motor M is operated in the closed loop mode (with switch 25 in its CL position), the feedback pulse generator 28 produces one pulse for each angular step executed by the motor shaft. The position of the rotor at which a given feedback pulse appears is fixed in relation to rotor equilibrium positions, depending upon the angular "phasing" with which the output shaft of the motor is mechanically coupled to the input shaft of the encoder. For ease of discussion, FIG. 3 illustrates sequential feedback pulses $F_a$, $F_b$, $F_c$ generated at each instant the rotor is respectively passing through an $A_{eq}$, $B_{eq}$, $C_{eq}$ position. It will be observed that when the rotor is at position p1, the A phase is switched on so as to drive the rotor toward the $A_{eq}$ position at 45°. When the rotor reaches that latter position, the specific feedback pulse $F_{a1}$ is generated. The next switching of phases is to occur, however, when the rotor is at position p3 which is (in this example) one-half step later. Thus, when the feedback pulse $F_{a1}$ is generated, it is passed through the time delay 29 (FIG. 1) so that it appears as the next switching pulse $S_{c1}$ — the latter causing turn-off of phase B and turn-on of phase C. If the rotor is stepping at a uniform speed, the angular difference of one-half step between the feedback pulse $F_{a1}$ and the switching pulse $S_{c1}$ may be considered as an equivalent time interval. That is, if the motor is running at 200 steps per second, each step (here 15°) requires 0.005 seconds and one-half step (here 7.5°) requires 0.0025 seconds. By constructing or adjusting the delay device 29 to provide a 0.0025 second delay, each switching pulse S (produced in response to a feedback pulse F) will occur at the proper switching lead angle $\beta_s$. Stated another way and as shown in FIG. 3, if the switching lead angle under given circumstances is $\beta_s$, but the feedback pulse precedes the switching position by a greater lead angle designated $\beta_f$, then the time delay device 29 introduces an equivalent angle $\alpha_{td}$, such that:

$$\beta_f = \beta_s + \alpha_{td}$$

The time delay angle $\alpha_{td}$ may be adjusted, in known fashion, to vary or change the steady state stepping speed at which the motor operates.

The known closed loop control system shown in FIG. 1 and its operation as made clear by FIG. 3 is very reliable because the phase switching which creates movement toward the next equilibrium position is initiated only after a given step has been, or will be, actually executed, and the instants of phase switching are properly related to rotor positions. That is, when the feedback pulse $F_{a1}$ appears (while phase B is excited) it is known that the rotor is 2.0 steps away from the $C_{eq}$ 75° position. Since a 1.5 step switching lead angle $\beta_s$ is required, the application of that feedback pulse through the 0.5 step delay circuit 29 results in switching of energization from the B to the C phase when the rotor is at position p3. Thus, closed loop control arrangements with physical feedback pulse generators mechanically driven by the motor itself are both desirable and widely used. They entail, however, the physical bulk and expense of a mechanically driven feedback pulse generator, its location in proximity to the step motor so that it can be mechanically driven, and, in some cases, long conductors to carry the feedback pulses to a remotely located sequencer.

The present invention brings forth a method and apparatus for detecting or confirming that a step motor rotor has reached a particular position during each stepping movement, but without the necessity for using a separate, mechanically driven encoder or pulse generator. As will become apparent hereinafter, the apparatus of the present invention is entirely electrical, has no moving parts, and may be physically located remotely from the stepping motor (adjacent to or within the sequencer 18) so as to be free of any harsh environment to which the motor is subjected.

The invention is founded upon the discovery that the recurring waveforms for phase currents in a running step motor contain intelligence indicative of the rotor positions as successive steps are executed. To facilitate an understanding of the nature of such currents, FIGS. 4 and 4a together will illustrate the nature of, and the sensing of, certain current waveforms which exist during stepping operation of the typical motor shown in FIGS. 1 and 2. In FIG. 4, the multiple winding phases are shown for simplicity as single windings A, B, C; and the power switching transistors $Q_a$, $Q_b$, $Q_c$ of FIG. 1 are illustrated for simplicity merely as correspondingly designated mechanical switches. It is assumed that the switches $Q_a$, $Q_b$, $Q_c$ are being sequentially closed one at a time in that order, their respective periods of closure being represented (as previously explained) by the squarewaves 30, 31, 32 in FIG. 3.

During the time that the switch $Q_a$ in FIG. 4 is closed, excitation current flows through phase A as indicated by the dashed arrow $I_{ao}$. In contrast, after the switch $Q_a$ is opened to de-excite phase A (and switch $Q_b$ is closed to excite phase B), dissipation current flows through the diode $D_a$ and phase A as indicated by the dashed arrow $I_{ad}$. One may thus characterize the current in a given phase as the "on current" which flows during those times when the phase is excited from the source voltage by turn-on of its associated power switch, and as the "off current" which flows during those times through the phase winding and the associated dissipation element or diode. Such currents may alternatively be termed respectively "the excitation current" and the "dissipation current". It is to be noted that in some instances, the "off current" in a phase is not due entirely to collapsing of the magnetic field built up in that phase; on the contrary, the "off current" may in part be created or influenced by mutual inductive coupling to the other phases of the motor which are turned on when a given phase is off.

As a first procedure and a first structural element in the practice of the invention, the phase currents of a stepping motor are sensed by one or more appropriate pickup elements to produce signals containing corresponding intelligence. Several pickup devices are shown by FIG. 4 in the very simple form of low ohmic resistors Ra1-Ra3, Rb1-Rb3, Rc1-Rc3 and Ro. These resistors produce signals or voltage drops across them as here respectively designated Va1-Va3, Vb1-Vb3, Vc1-Vc3 and Vo in response to currents through them and in accordance with Ohm's law. The resistors are sufficiently small in ohms that they do not appreciably affect the normal operation of the step motor. Not all of these current-sensing resistors are required in the practice of the invention according to any one of the several possible embodiments, but their illustration in FIG. 4 will aid in an understanding of the nature of the "on" and "off" currents, and such resistors will make clear different alternatives by which such currents may easily be sensed. Of course, other well known current sensing pickup devices, such as current transformers, tapped current windings, separate pick-up coils, and the like may be employed in lieu of current-sensing resistors. The pick-up devices may, for example produce voltage waveforms which are the counterparts of the phase current waveforms, or they may produce signals corresponding to the time derivatives of such current waveforms, or they may be signal variations which for example are amplitude, phase or frequency modulated according to the current variations.

Referring to FIG. 4a, the squarewave pulses at 30 indicate those periods of time during which the A phase of FIG. 4 is excited by closure of the switch $Q_a$. The waveform 36 representing current $I_a$ corresponds to the voltage Va1 which appears across the resistor Ra1 as the phase A winding is successively turned on and off. The current waveform at 36 is recurring in nature with a periodicity equal to the sum of the time intervals during which the A, B and C phases are turned on. During the time that the A phase is turned on, the phase A current rises from an initial value represented at 37 to a peak which appears at 38 and then falls to a lower value at 39 by that instant in time when the A phase is turned off again. This is the nature of the A phase "on current" as it is influenced by the inductance of the A phase windings, mutual inductive coupling to the B and C phases, and the changing reluctance of the magnetic paths in the stepping motor M as the rotor 10 turns.

When the A phase is turned off (and the current has fallen to the value represented at 39) continued current through the resistor Ra2 and the opened switch $Q_a$ is not possible. At this instant, however, dissipation current begins to flow through the diode $D_a$, the resistor Ra3 and the resistor Ra1. Thus, the phase current $I_a$ continues to flow but it decreases to a minimum value at 40, this minimum value occurring shortly before phase B is turned off as represented by the square waveform 31. The dissipation current thereafter rises, and continues to rise during the time interval when phase C is turned on, the latter being represented by the waveform 32. Just prior to the next turn-on of phase A, the dissipation current reaches a second maximum peak at 41, then falls slightly, and then begins to rise again at the instant the A phase is turned on. It is believed that the reason for the initial decrease followed by a subsequent increase in the "off current" of phase A lies in the mutual inductive coupling of the A phase windings to the other phase windings which are being sequentially turned on during that time that the A phase is turned off.

In any event, the recurring waveform 36 representing current through the phase A is a generalized, non-rigorous illustration of the current variations which have been experimentally observed in an exemplary or typical stepping motor. These current variations contain characteristics which appear in relation to rotor position and which, in keeping with the invention, are detected to produce signals indicative of the fact that the rotor has reached a particular position in travel within the span of one step. While position-related characteristics of different kinds (e.g., slope flexures, slope thresholds, current thresholds and the like) may be observed in the current waveforms associated with different specific motors, the characteristics noted in the waveform 36 for the exemplary motor M are peaks (zero slope) which are position related. It is apparent that a maximum peak 38 occurs in the waveform 36 during the A phase "on" interval, and a minimum peak 40 occurs at the switching period immediately following turn-off of the A phase. It will thus be understood that if an oscilloscope were connected to the terminals of the resistor Ra1 to display the voltage Va1 representing the current through phase A while the motor is continuously stepping, the displayed waveform would be substantially like that shown at 36 in FIG. 4a. It may be noted, incidentally, that the phase A current always flows in the same direction through the phase A windings, and it never falls to zero during those intervals when the B and C phases are turned on (and the A phase is turned off).

The foregoing discussion of the A phase current 36 and the sensing of that current by resistor Ra1 to create the voltage signal Va1 applies equally well to the remaining phases B and C. The B and C phase currents are sensed in the same fashion by the resistors Rb1 and Rc1, and the resulting voltage signals will have exactly the same waveform shape, although they will be respectively displaced in time and phase. The B phase current $I_b$ is represented by waveform 47 in FIG. 4a, but the C phase current $I_c$ is, for brevity, not shown. The current $I_b$ has maximum "on current" peaks at 47a, 47b and minimum "off current" peaks at 47c, 47d, and maximum "off current" peaks at 47e, 47f.

If one so desires, it is a simple matter to sense only the "on current" of phases A, B and C. Thus, by placing a sensing pickup device in the location shown for resistor Ra2, current will flow through that resistor only when the power switch $Q_a$ is on, and such current will be exactly the same as that which is then flowing through the phase A winding. The recurring waveform shown by solid line at 42 in FIG. 4a thus represents the on current $I_{ao}$ which flows through phase A, and this is signaled by the Va2 voltage which appears across the sensing resistor Ra2. Of course, the waveform 42 corresponds in shape to the waveform 36 during those times that the A phase is turned on, and it has a zero value during the $B_{on}$ and $C_{on}$ time intervals. It will be observed that when the A phase is turned on, the on current $I_{ao}$ and the voltage Va2 will rise to peaks at 43 and then begin to fall. The sensing resistors Rb2 and Rc2 will in similar fashion produce voltages Vb2 and Vc2 which vary in the same fashion as waveform 42 to represent the B and C phase "on currents".

The "off currents" of the several phases may be individually sensed by the resistors Ra3, Rb3 and Rc3 which are respectively in series with the flyback diodes $D_a$, $D_b$, $D_c$. Considering phase A, when the switch $Q_a$ is opened, dissipation current continues to flow, as explained in connection with waveform 36. Such dissipation current $I_{ad}$ produces a voltage signal Va3 across the resistor Ra3 which corresponds in shape to the waveform 36 whenever the A phase is turned off. This is represented in FIG. 4a by a waveform 45. It will be seen that a minimum current peak 46 occurs in the dissipation current, and in the waveform of voltage Va3, at that time instant which corresponds to the minimum current peak 40. It is to be noted, however, that the polarity of the voltage Va3 is negative-to-positive from top to bottom of the resistor Ra3 as illustrated in FIG. 4.

Finally, FIG. 4 further indicates that all of the "on currents" for all of the phases may be sensed and signaled by a single resistor Ro which is connected in series with the three parallel current paths for the three respective phases and their power switches. The current which flows through the resistor Ro is simply the successive individual "on currents" which flow through the separate phases, and such current is represented by the waveform 42 in FIG. 4a taken with the dotted line portions 48 and 49 which appear during those time intervals when the B and C phases are turned on. Thus, if one observes the voltage Vo in FIG. 4 on an oscilloscope, the voltage representing all of the on currents of the separate phases will appear somewhat like the waveform 42 supplemented by the dotted line portions 48 and 49. It will be noticed that a current peak 43 appears during the $A_{on}$ time, while a current peak 50 occurs during the $B_{on}$ time and a current peak 51 occurs during the $C_{on}$ time.

In carrying out the present invention in one preferred form, a suitable device responsive to the phase current sensor is employed to produce an output signal each time a preselected one of the current peaks occurs. That is, since peaks appear at 38, 40 and 41 during each cycle of the A phase current $I_a$, one of those is detected; and the corresponding one in the B and C currents is detected. More particularly, electrical circuit means in the form of a peak detector are connected to receive signals representing sensed currents and to produce an output pulse in predetermined time relation to the appearance of a particular one of the current peaks in each phase. Generically, the particular peak which is detected in each phase current may be one which appears while that phase is excited, or it may be one which appears while that phase is de-excited. In other words, the "on" or "off" currents (or both) may be sensed, so long as the detector circuitry operates to respond to the same peak in the recurring waveform for each phase. But for each step which is executed by the motor, there will be at least one output signal which confirms that the rotor has reached a given angular position and indicates that a step has been, or is about to be, consummated. This aspect of the invention may be employed with step motors which exhibit phase current waveforms considerably different from the specific shape shown at 36 in FIG. 4a, so long as the differently shaped waveform exhibits at least one peak per cycle. And in the broader sense of the invention, some corresponding criterion — such as the current slope reaching a predetermined threshold value or undergoing a flexure — in each phase current may be detected to confirm that the rotor has reached a predetermined position within each step.

Figure 5:
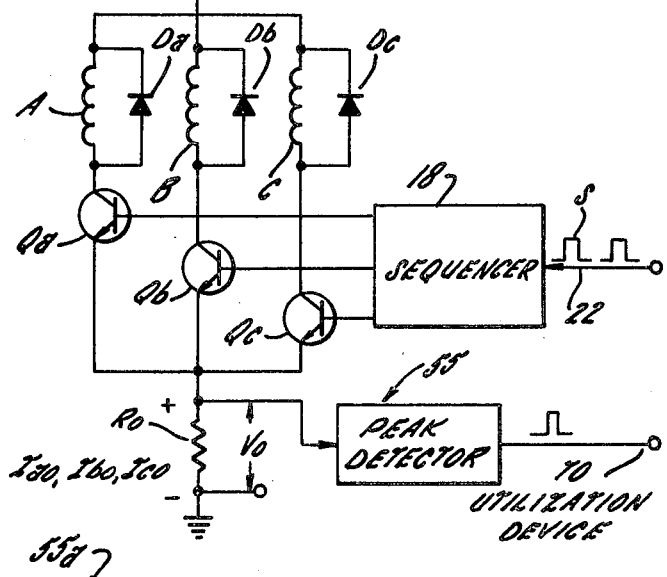
FIG. 5 is a generalized schematic and block diagram of one embodiment of apparatus for producing rotor position-indicating signals according to the present invention.

One simple embodiment of the invention is illustrated in FIG. 5 as responding to peaks which appear in the "on currents" of the phases. For this purpose, the three "on currents" are sensed by a single resistor Ro which corresponds to the similarly labeled resistor in FIG. 4, and voltage Vo is supplied to a peak detector 55. The voltage Vo will have the shape of the waveform 42 (FIG. 4a) supplemented by the dotted line portions 48 and 49 so that as phases A, B, C are respectively excited one at a time in sequence, the peaks 43, 50 and 51 will successively appear. Moreover, at a given stepping speed of the motor, the A current peak 43 (FIG. 4a) will always have a lead angle $\beta_p$ of constant value with respect to the next $B_{eq}$ position, the B current peak 50 will appear with the same lead angle $\beta_p$ with respect to the next $C_{eq}$ position, and the C current peak 51 will have the same lead angle $\beta_p$ relative to the next $A_{eq}$ position. Thus, it will be understood that the recurring waveform for the current-representing voltage Vo will appear as shown at 42a in FIG. 7, reaching a maximum peak at 43a, 50a and 51a during those successive time intervals when the A, B and C phases are respectively turned on.

One suitable form of the peak detector 55 (FIG. 5) is illustrated in detail by FIG. 6. Generally speaking, it is an analog circuit for producing an output pulse each time that its input signal Vo passes through zero slope, i.e., rises and then begins to fall with a change in sign of slope from positive to negative. To accomplish this, the voltage Vo is transmitted from the resistor Ro to a suitable time differentiator 56 (often called a de/dt circuit) here shown as a series capacitor 57 followed by a shunt resistor 58. The differentiated signal labeled $V_1$ is applied to a polarity detector shown, for example, as a high gain open loop operational amplifier 60. The voltage $V_1$ is supplied to the inverting input of the amplifier 60 and the non-inverting input is fed with zero voltage through a resistor 60a. If the input voltage $V_1$ is even slightly negative, the output of the amplifier 60 is driven to full saturation in a positive sense; but if the voltage $V_1$ is zero or positive, then that output voltage is driven to its full or maximum negative value. A clipping diode 61 may be employed to block the negative swings in the amplifier output $V_2$ transmitted to a second differentiator 62. The negative pulses produced by the differentiator are clipped by a shunt diode 63 so that the final output voltage $V_3$ is a series of positive pulses — each resulting from a peak which occurs in the input signal and being located in predetermined time relation to that peak.

The operation of the peak detector circuit in FIG. 6 will be better understood from the waveforms shown in FIG. 7. With the current-representing voltage Vo appearing as illustrated by the waveform 42a, the output of the differentiator 56 has the shape illustrated for the voltage $V_1$ by the waveform 66. That is, between the instants $t_1$ and $t_2$ while the A phase is turned on, the voltage Vo has positive (but decreasing) slope until it reaches the maximum or peak 43a, and thereafter has a falling or negative slope between the instants $t_2$ and $t_3$. Therefore, the voltage $V_1$ is positive but falling between instants $t_1$ and $t_2$, reaches a zero value at the instant $t_2$ coinciding with the current peak 43a, and then has a negative value between the instants $t_2$ and $t_3$. With the voltage $V_1$ applied to the input of the operational amplifier 60 and its clipping diode 61, the voltage $V_2$ thus appears as a squarewave 68 having a substantially constant maximum value between instants $t_2$ and $t_3$ when the voltage $V_1$ is negative, i.e., less than zero. The positive-going leading edges of the squarewaves in the voltage $V_2$ occur substantially simultaneously with the current peaks 43a, 50a and 51a. In passing through the differentiator 62, the squarewave voltage $V_2$ is converted into positive and negative going pulses coincident with the leading and trailing edges of the squarewaves, but the negative going pulses are shunted by the diode 63. Therefore, the output voltage $V_3$ as shown in FIG. 7 is constituted by a series of pulses 69 each coindicent with a zero-to-positive leading edge in the waveform $V_2$ — and each being substantially coincident with one of the current peaks 43a, 50a, 51a. In the present instance, the output signals or pulses 69 are essentially coincident with the detected current peaks, but this constitutes a predetermined time relationship, and as hereinafter noted it is sufficient if the output pulses appear with any predetermined time spacing from the instants that the detected current peaks occur.

The output pulses 69 from the peak detector shown at 55 in FIGS. 5 and 6 may be applied to any suitable utilization device. They contain significant and useful information. For example, the output pulses may be supplied to an analog or digital computer which processes then with or without additional inputs to create various control signals or displays. As another example, the output pulses 69 may be applied to a counter which accumulates a quantity of pulses received and signals to a display device or the like a numerical representation of the total distance through which the motor has stepped, i.e., the total number of steps which have occured. Thus, the output pulses may be fed to a counter or integrator in order to signal or indicate the displacement or position of a load drivingly coupled to the motor output shaft. Such a displacement signal may be employed for feedback in a position servo system. Alternatively, the output pulses 69 may be fed to a rate meter circuit which signals or indicates the frequency with which they appear. Such an indication is useful as designating the average velocity at which the step motor rotor is turning, and the velocity signal may be used for feedback in a velocity servo loop. Finally, and as another important example to be described in detail below, the output pulses 69 from the peak detector may be used to derive switching pulses applied to the motor sequencer 18 in a closed loop arrangement, so that substantially all of the advantages of closed loop operation are obtained without the necessity of a mechanically driven feedback pulse generator.

Figure 8:
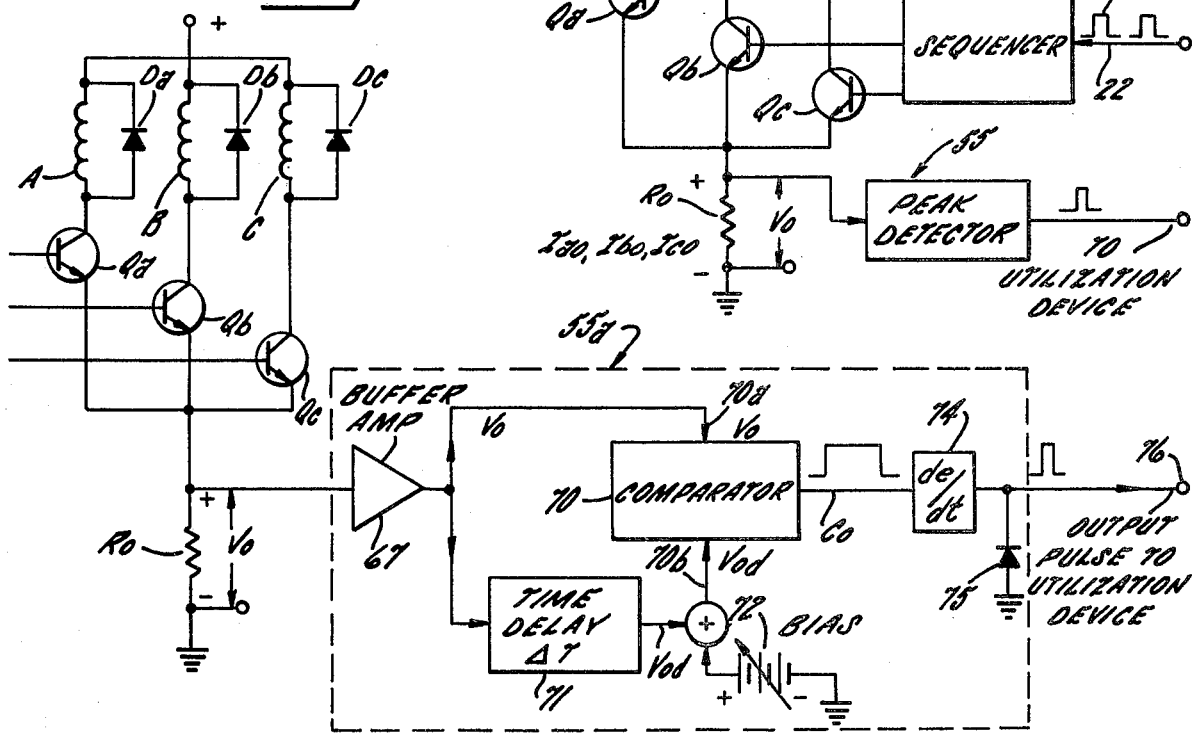
FIG. 8 is a schematic and block diagram of a second embodiment of the present invention and which operates to produce rotor position-indicating pulses.

FIG. 8 depects another embodiment of the invention. It is similar to that of FIG. 5 but employs a peak detector 55a of a different type. The voltage Vo is a waveform like that shown at 42a in FIG. 7 and represents the three "on currents" which flow through the phases A, B and C of the step motor. The particular peak detector 55a includes a buffer amplifier 67 which merely amplifies the voltage Vo and isolates the resistor $R_o$ from the following components. To detect the current peaks which are represented by the peaks in voltage Vo, the current-representing voltage Vo is passed from the buffer amplifier 67 directly, and also through a time delay circuit 71, to the respective inputs 70a, 70b of a voltage magnitude comparator 70. The output of the time delay circuit 71 is here designated $V_{od}$. It will lag the voltage Vo by a selected period $\Delta T$. The comparator 70 may for example be a high gain operational amplifier which produces a high, fixed voltage at its output $C_o$ only when the input signal $V_{od}$ exceeds the input signal Vo. That voltage $C_o$ is passed through a differentiator 74 whose output is prevented from falling negative by a shunt diode 75. The detector 55a operates to produce a train of output signals or pulses at its terminal 76, there being one such pulse for each step executed by the motor and each such pulse appearing in fixed time relation to the peak which appears in the excitation current of a phase.

The cooperative operation of the time delay circuit 71 and the comparator 70 may be seen from FIG. 9 which is drawn with the assumption that an adjustable bias voltage source 72 (FIG. 8) has been set to make the amplitudes of the recurring voltages Vo and $V_{od}$ substantially identical. As indicated in FIG. 9, the voltages Vo and $V_{od}$ have identical shapes, with the latter by the delay interval ΔT created by the circuit 71. At the instant $t_1$ in FIG. 9 when peak 43a in the voltage Vo occurs, the voltage $V_{od}$ is lower and still rising toward its peak 43d. But as the voltage Vo then begins to fall, the two voltages become equal — and $V_{od}$ slightly exceeds Vo — essentially at the instant $t_2$. It is at this instant that the comparator output $C_o$ changes from a low (e.g., zero) to a high (e.g., 5 volts) value. The positive-going transition in the voltage $C_o$ thus has a predetermined time relationship to the detected current peak 43a (i.e., lags the peak by a fixed interval T). This is entirely acceptable in the practice of the invention because the interval T will be constant.

If it is desired, however, the fixed time interval T may be adjusted or varied merely by changing the bias voltage from source 72. FIG. 10 illustrates the different effects when the bias voltage is (a) the same as that assumed for FIG. 9, (b) a lesser value, or (c) a greater value. In these respective cases, the voltage $V_{od}$ will always reach its peak 43d after the same delay ΔT from the peak 43a, but the crossing points of the Vo and $V_{od}$ voltages will occur respectively at those instants labeled $t_1$, $t_2$ or $t_3$. In the first case, the fixed time interval between peak 43a and the low-to-high transition of the comparator output $C_o$ will have a value labeled T. But in the second case it will have a greater value labeled $T_1$, and in the third case it will be substantially zero. Thus, the fixed time interval T between the occurrence of a current peak and a resulting output signal may be adjusted simply by varying the voltage from the biasing source 72.

The operation of the electrical apparatus shown in FIG. 8 is made clearer by the graphs of FIG. 11, wherein the direct and the delayed voltage Vo and $V_{od}$ are shown separated in time by an interval ΔT introduced by the time delay circuit 71. The Vo signal falls below the delayed signal $V_{od}$, and the output signal $C_o$ of comparator 70 rises at an instant $t_2$ which follows the instant $t_1$ of peak 43a by the interval T. Thereafter at instant $t_3$ (when phase A is turned off and phase B is turned on) the voltage $V_{od}$ falls below the voltage Vo and the comparator output $C_o$ is restored to zero. This occurs over and over as the phases A, B, C are sequentially turned on, so that the voltage $C_o$ is a recurring squarewave 78. The differentiator 74 and diode 75 respond to that squarewave to produce output signals 79 in the form of positive-going pulses substantially coincident in time with the positive-going transitions in the wave $C_o$. Thus, the output signals are a train of pulses 79, each indicating that the stepping motor has taken one step and each having a predetermined time relation to the instant that a phase "on current" has reached a peak. Thus, the output pulses 79 have a predetermined time relationship to those instants that the rotor has reached successive predetermined angular positions. The output pulses 79 may be sent to any appropriate utilization device, as noted previously.

Referring next to FIGS. 12 and 13, another embodiment of the present invention, characterized by a digital delay means in the peak detector, is shown in association with a system for operating a step motor in the closed loop mode. A buffer amplifier 80 transmits the sensed current-representing voltage Vo directly to one input 81a of a comparator 81, and a via a sample-and-hold delay circuit 82 to the other comparator input 81b. The delay circuit 82 is activated by a clock 84, i.e., a source of relatively high frequency pulses. The circuit 82 will be explained in detail below with reference to FIG. 13.

It has been found in practical applications of the apparatus which includes the comparator 81 (or the comparator 70 in FIG. 8), that there may be some "noise" in the output voltage $C_o$ caused by motor phase current transients when the phase windings are switched. Accordingly, an inhibit circuit 85 (FIG. 12) is utilized to prevent the creation of positive-going output pulses if positive-going wavefronts in the signal $C_o$ exist when the motor is switching.

In any event, and as will become clear, there are current peak-representing output pulses (similar to those shown at 79 in FIG. 11) produced on an output terminal 86. Each such output pulse indicates the occurrence of one peak in the sensed currents and the corresponding current-representing voltage Vo. As indicated in FIG. 12, these pulses are fed back through a time delay circuit 88 to the input 22 of the switching sequencer 18 to "close the loop" so that each motor step causes the next switching of phases to occur, and given step is not initiated by phase switching until the preceding step has been, or with certainty will be, fully executed. The delay circuit 88 creates a time delay corresponding to the angle $\alpha_{td}$ described above with reference to FIG. 3, so that even though each output pulse has a lead angle $\beta_p$ longer than the required switching angle $\beta_s$, the switching pulses are made to appear with the desired lead angle $\beta_s$. The output pulses which appear on terminal 86 are also shown as being fed to utilization devices in the form of a counter 90 and a rate meter 91 which will respectively signal the total displacement and the average velocity of the rotor as the stepping motor runs.

The apparatus of FIG. 12 is shown in greater detail by FIG. 13, wherein the buffer amplifier 80 appears as an operational amplifier having an output terminal 80a at which the voltage Vo is reproduced. By selecting the values of the associated feedback and biasing resistors, the buffer amplifier can be made to match the current-representing voltage from the sensing resistor Ro associated with different particular step motors to the range of variation which will be accommodated by the subsequent circuit components.

The time delay circuit 82 operates on a clocked sample-and-hold procedure. It includes a field effect transistor (FET) $Q_1$ receiving on its source $s$ the amplified voltage Vo from the terminal 80a, there being a control resistor 94 connected between its source $s$ and gate $g$ as shown. There is a series path from the terminal 80a through the resistor 94, a diode 95, and the emitter-collector path of a transistor $Q_2$. The output terminal or drain $d$ of transistor $Q_1$ leads to a storage capacitor 96 having one terminal grounded. The capacitor is in turn connected via an input resistor 97 to a high input impedance, unity gain, operational amplifier 98. The delayed voltage signal $V_{od}$ appears at the output of this latter amplifier. It corresponds to the voltage $V_s$ which appears across the capacitor 96, and the amplifier 98 does not create a path through which the capacitor 96 can discharge to a significant degree.

To cause frequent charging (or discharging) of the capacitor 96 to the then-existing value of the voltage Vo at terminal 80a, the transistor $Q_2$ is rendered normally on and is periodically turned off. To accomplish this, the clock oscillator 84 is connected to the base of $Q_2$ which is biased positively by a resistor 100. The output of the clock oscillator 84 is a succession of relatively short negative-going pulses, each of which briefly turns off the transistor $Q_2$. The period $T_c$ of these clock pulses is relatively short, i.e., they occur with a frequency which is several times greater than the switching frequency at which the motor phases A, B, C are sequentially turned on.

When the transistor $Q_2$ is rendered fully conductive because no negative clock oscillator pulse exists, current may flow from terminal 80a through the control resistor 94, forwardly through the diode 95, and thence through the collector-emitter path of $Q_2$ to ground. This creates a voltage drop labeled $V_{gs}$ across the resistor 94, makes the gate g negative with respect to the source s, and thus renders the transistor $Q_1$ non-conductive. However, each time that a clock pulse turns off transistor $Q_2$, then the diode 95 is reversely biased, current flow through resistor 94 is stopped, and the voltage $V_{gs}$ drops to zero. Because the gate g is not negative with respect to the source s, the transistor $Q_1$ is made fully conductive between its source s and its drain d so that current may flow to or from terminal 80a to quickly discharge or charge the capacitor 96 substantially fully to the then-exisiting value of the voltage Vo. Thus, at frequent, periodic sampling instants, the voltage $V_s$ is brought to the value of the voltage Vo, and the voltage $V_s$ remains substantially at the sampled value until the next sampling pulse occurs.

This operation is illustrated by the graphs for the voltage Vo and the voltage $V_s$ in FIG. 14, illustrating how the latter changes in response to the appearance of the clock pulses $C_p$. When a clock pulse 101 appears at the instant $t_1$, the capacitor 96 charges rapidly from its previous voltage value almost to the then-existing value of the voltage Vo. Between instants $t_2$ and $t_3$ the voltage $V_s$ remains essentially constant, and then rapidly rises toward the then-existing value of the voltage Vo when the next clock pulse appears at instant $t_3$. The voltage $V_s$ thus appears somewhat in the form of stairsteps but it follows generally the variations of the sampled voltage Vo. It may be seen from FIG. 14 that if a peak 43a appears in the voltage Vo at instant $t_4$, then the voltage Vo will become equal to and fall slightly below the voltage $V_s$ at a later instant $t_5$ which is delayed from the peak 43a by a predetermined time T. The frequency of the clock pulses $C_p$ has been illustrated in FIG. 14 to be very low, simply to better illustrate the operating principles involved. In actual practice, the frequency of the clock pulses $C_p$ would be made higher, and the detection instant $t_5$ will always occur within one clock interval of the peak 43a in the voltage Vo.

The comparator 81 in FIG. 13 is formed very simply by a high gain operational amplifier operated as a summing switch. That is, the voltages Vo and $V_{od}$ (the latter appearing exactly like $V_s$ shown in FIG. 14) are applied through input resistors 105 and 106 to the inverting and non-inverting terminals of a summing amplifier 104, these inputs also having resistors 107 and 108 connected to a 15 volt biasing source. By adjusting the resistor 108, the effective relative dc. levels of the voltages Vo and $V_{od}$ may be varied, so that the comparator output switches with a desired time relation to the occurrence of a peak in the voltage Vo. It will be understood that the comparator output $C_o$ is fully negative ("0" level) when $V_o$ exceeds $V_{od}$, and is fully positive ("1" level) when $V_{od}$ exceeds Vo.

Figure 15:
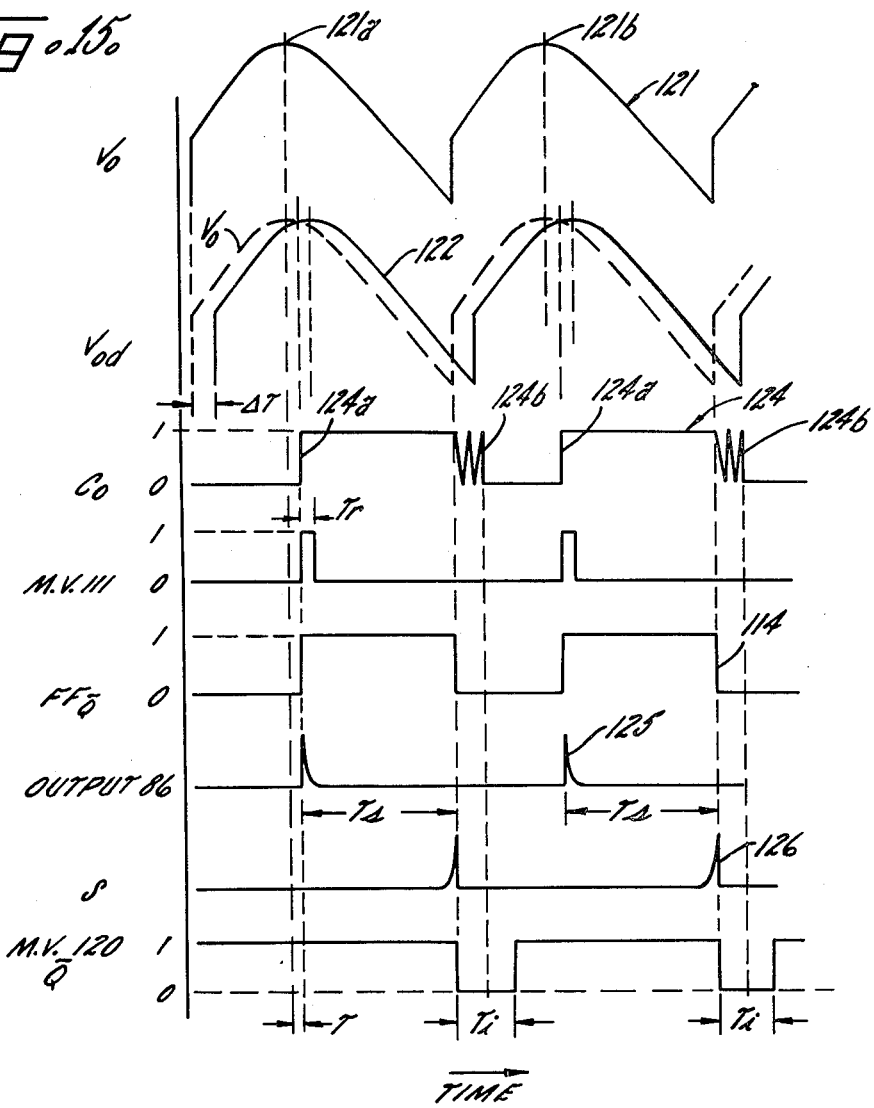
FIG. 15 is a timing chart illustrating in more detail certain signals or voltages as they appear during operation of the apparatus shown in FIG. 13.

The squarewave output voltage $C_o$ (appearing generally as shown at 78 in FIG. 11) is applied through a gate 110 to the input of a monostable multivibrator 111 which triggers on a positive-going wavefront and which switches itself off after a predetermined interval ($T_r$ shown in FIG. 15). Assuming that the gate 110 is enabled by the application of a "1" level at its second input, the monostable multivibrator 111 is triggered each time that a current peak in the voltage Vo appears, and it supplies a pulse to the reset terminal R of a flip-flop 112. Assuming that the latter had been residing in its set state, the voltage 114 at the $\overline{Q}$ terminal of the flip-flop thus rises from a low to a high level. The flip-flop will be restored to its set state as noted below each time after it has been so reset.

The periodic squarewave voltage 114 from the flip-flop 112 is passed through a differentiator 115 which includes a diode 116 to block negative-going pulses. According, positive-going pulses appear at the terminal 86, there being one such pulse for each detected current peak.

The output pulses from terminal 86 are passed to the counter 90 and the rate meter 91, as previously explained. FIG. 13 shows the further detail that these elements may be respectively associated with readout or display devices 90a and 91a so that the displacement and velocity of the running step motor may be noted by a human attendant or operator. Those same output pulses are passed through the time delay 88 to form switching pulses S coupled via an OR circuit 107 and a normally closed stop switch SP to the input 22 of the sequencer 18. In addition, starting of the system may be effected by closing a normally open start switch ST to pass pulses from source 128 through the OR circuit to the sequencer 18. In addition, the switching pulses (which are delayed counterparts of the output pulses) are also fed (a) to the setting input terminal of the flip-flop 112, and (b) the triggering input of an inhibiting monostable multivibrator 120. The output of the latter is connected to the second input of the gate 110 which receives the comparator output voltage $C_o$.

With the foregoing in mind, the operation of the apparatus shown in FIG. 13 may be better appreciated by reference to the graphs in FIG. 15. As the voltage Vo changes in a recurring waveform 121 when the stepping motor phases are sequentially excited, the sample-and-hold circuit 82 produces a counterpart $V_{od}$ as represented by the waveform 122 which is delayed by the interval $\Delta T$ from the voltage $V_{od}$. With these two voltages Vo and $V_{od}$ being applied to the comparator 51, the output $C_o$ is a recurring square waveform illustrated at 124 in FIG. 15, there being a positive-going transition 124a substantially at each instant when the voltage Vo falls below the voltage $V_{od}$ after having reached a peak at 121a and 121b. When the voltage $C_o$ rises to a high positive value, it remains there until the voltage $V_{od}$ again falls below the voltage Vo, and this will occur in the neighborhood of the time instants at which the excited phase is turned off and the next phase is turned on. There may, however, be some noise in the output of the comparator 81 at about the time that the motor phase switching occurs, and this is represented by the stuttering or oscillations shown at 124b. Because these rapid switchings of the comparator output level involve positivegoing wavefronts, they might, unless an inhibitor is used, result in false output pulses not representative of a phase current peak. It is for this reason that the monostable multivibrators 111, 120 and the gate 110 are employed together with the switching flip-flop 112. In essence, the monostable multivibrator 111 is prevented by the gate 110 and the multivibrator 120 from being switched on until a predetermined time interval has elapsed since its previous switching. Thus, when the wavefronts 124a in the signal $C_o$ occur, the output of the multivibrator 111 forms a positive pulse of a predetermined short duration $T_r$. This causes the flip-flop 112 to be periodically reset so that the output voltage 114 at the Q terminal rises from a low to a high level. At each of these instants, the differentiator 115 produces a positive-going pulse at the terminal 86, so that the output pulses appear in sequence as represented at 125 in FIG. 15. The time delay device 88 responds to each of these output pulses so as to produce corresponding switching pulses S delayed by the intervals $T_s$, such switching pulses being represented at 126. Each such switching pulse immediately resets the flip-flop 112 so that it is ready to respond to the next positive-going pulse from multivibrator 111. And those same switching pulses S trigger the inhibit multivibrator 120 so that its output signal (which normally resides at a high or "1" level) switches to a low or zero level for a predetermined time interval here labeled $T_i$. That output signal at a low level for the period $T_i$ disables the gate 110 so that any positive-going wavefronts whicy may appear in the oscillations at 124b cannot trigger the multivibrator 111. In this fashion, any "noise" which may arise due to switching transients in the current waveform is precluded from producing false output pulses. Instead, there is one output pulse 125 in response to each sensed current peak and that output pulse appears delayed by a fixed time interval T from the instant that the current peak occurs. As explained earlier, this period T may be adjusted, if desired, by varying the biasing resistor 108 associated with the comparator 104.

Referring again to FIG. 4a and to the waveform 47 which represents the current flowing through the B phase, it will be seen that "on current" peaks 47a, 47b appear when the rotor is at position p4. In the operation of the apparatus shown in FIG. 13 the "on current" peak 47a will result in the appearance of an output pulse when the rotor is at the position p5, the change in position $\alpha_T$ resulting from the fact that the output pulse appears delayed from the peak 47a by some predetermined and selectable period T. Thus, as labeled in FIG. 4a, the output pulse which results from a peak in the B phase current is detected with a lead angle $\beta_p$ relative to the next C equilibrium position $C_{eq}$. Since the desired switching angle, designating the rotor position at which the B phase is to be turned off and the C phase is to be turned on here shown as $\beta_s$, is less than $\beta_p$, the delay circuit 88 in FIG. 13 is adjusted to provide a time delay which is equivalent to a rotor displacement angle $\alpha_{td}$. Thus, from the relationships which are shown in the lower portion of FIG. 4a, it will now be understood that the switching pulse S which triggers the sequencer 22 to turn off phase B and turn on phase C is made to occur with the desired lead angle $\beta_s$ by taking into account the equivalent angle $\alpha_T$ which may exist due to timing relationships in the peak detector apparatus plus the equivalent angle $\alpha_{td}$ created by the time delay circuit 88. By adusting either or both $\alpha_T$ and $\alpha_{td}$, reliable operation of the stepping motor in a closed loop mode may be obtained. When any phase is turned on, then switching to the next phase in sequence cannot occur until the "on current" peak is detected to confirm that the motor has reached a particular angular position and will certainly complete its step at least to the next equilibrium position for the phase which is excited. Thus, there is high reliability in the execution of successive steps; speed may be controlled by adjusting the duration of the time delay created by the device 88; and either or both displacement and velocity may be readily signaled in response to the current peak-representing output pulses.

The closed loop arrangement of FIG. 13 creates each switching pulse in response to execution, or confirmation, of each step. It is necessary, therefore, to inject the first one or two pulses into the loop in order to start the motor. This may be accomplished in any of a variety of ways. As diagrammatically shown in FIG. 13, a recurring pulse source 128 is connectable to the sequencer input line 22 via a push-button start switch ST, the OR circuit 107 and a normally closed push-button stop switch SP is disposed in that line. It is only necessary to momentarily close switch ST to inject one or two starting pulses in order to get the motor started. Thereafter, momentary opening of switch SP will stop the motor.

Figure 16:
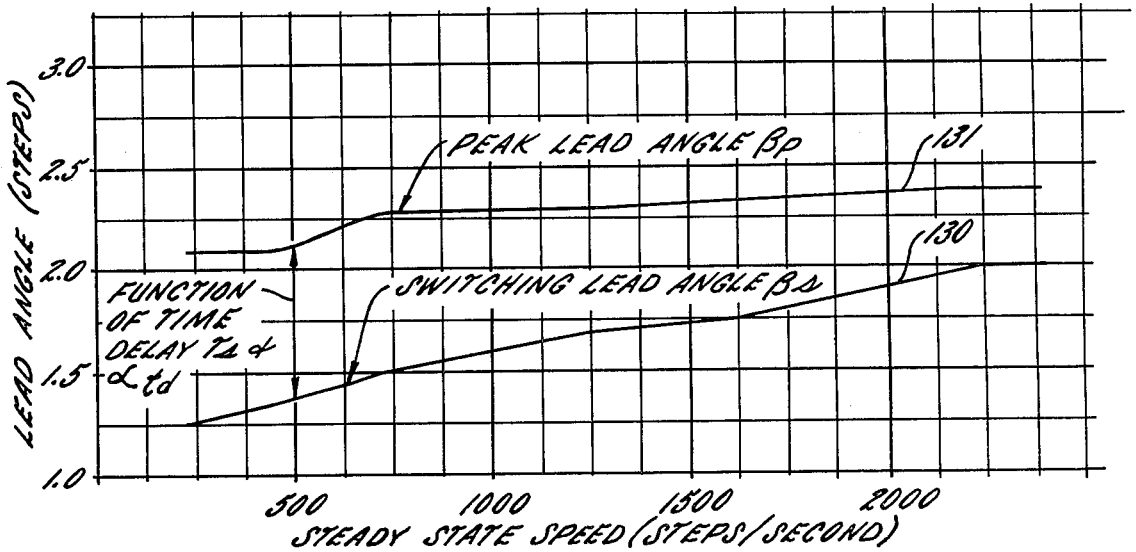
FIG. 16 is a graph illustrating the switching lead angle required for operation of the exemplary stepping motor at various steady state speeds, together with an illustration of the peak detection lead angle at such various steady state speeds.

FIG. 16 contains a plot 130 of the switching lead angle $\Delta_s$ required to make a typical step motor (specifically, a type SM-024-0035-AA manufactured and sold by Warner Electric Brake & Clutch Company) operate at various steady state stepping speeds. Generally speaking, the lead angle $\Delta_s$ must be increased to make the motor step at a higher rate. On the other hand, the graph 131 in FIG. 16 represents the values of the lead angle $\Delta_p$ with which "on" current peaks occur at different motor stepping rates (it being assumed that the detection delay T and its corresponding angle $\alpha_T$ are essentially zero). The difference in value between the curves 130 and 131 is provided by the delay angle $\alpha_{td}$ injected into the system by the delay circuit 88 (FIG. 13). FIG. 16 indicates that the peak lead angle $\beta_p$ varies slightly with speed, but somewhat in the same fashion as the required switching angle $\beta_s$. Such changes in the peak lead angle $\beta_p$ with speed arise, it is believed, from the changing influence of the phase inductance at greater switching frequencies, and the tendency of the rotor to lag as speed increases. In any event, it may be seen that by varying the delay $T_s$ created by the delay circuit 88 in FIG. 13, the angle $\alpha_{td}$ necessary to convert the peak lead angle $\beta_p$ into the required switching lead angle $\beta_s$ can be obtained in order to make the controlled step motor run at any desired steady state stepping speed.

It may be noted, incidentally, that the control apparatus in FIGS. 12 and 13 will function equally well when the sequencer 18 is conditioned to cause the motor to step in either a counterclockwise or a clockwise direction, i.e., to energize the phases in an A, B, C or a B, A, C sequence. The first of such sequences has been assumed in the foregoing description, but the "on current" peak sensing closed loop system will operate successfully in either case.

The description thus far with reference to FIGS. 5 through 16 has been focused upon sensing of peaks which occur in the "on currents". Because, as noted, there is only one maximum peak associated with each phase current, and it always occurs while that phase is excited, the individual phase currents can be collectively sensed and married into one recurring signal Vo having a frequency equal to the switching frequency. It has been found, however, that in some step motors the "on current" peaks become difficult to detect when the motor is operating within certain speed ranges. For example, the specific type SM-024-0035-AA motor identified above has been found to operate reliably in a system such as that shown by FIG. 13 at speeds from 0 to 70 and 300 to 2200 steps per second. In the range of 70 to 300 steps per second, the "on current" waveforms do not contain peaks which can be reliably detected by simple detectors of the kind here described. This does not lessen the importance of the system shown in FIG. 13, however, because in many applications the motor is to be run at speeds which are above 300 steps per second, and this lower end of the usable speed range can be reached by injecting two or more starting pulses into the loop. Generally speaking, the "on current" peak detector system is more reliable with low resolution (large steps) step motors, and thus having greater winding inductance, as compared with high resolution (small steps), low inductance motors. For example, Model SM024-0045-RG motor manufactured by Warner Electric Brake & Clutch Company exhibits on-current peaks over substantially its entire speed range. Three phase motors appear to be more easily controlled by "on phase" peak detection than do four phase step motors. As a broad observation, most step motors seem to run in the closed loop arrangement of FIG. 13 with a peak detection lead angle $\beta_p$ in the range of two steps. This, however, is an advantage rather than a disadvantage because the switching lead angles $\beta_s$ are of lesser but similar magnitudes, and the difference may be made up by the supplemental angle $\beta_{td}$ created by the time delay circuit 88. Moreover, it has been observed that the "on current" peak detection system appears to be more reliable with one-phase-on step motors as contrasted with those which are excited in the two-phase-on mode. Yet, it has been found that the peak detection system as described above, and the closed loop arrangement in which it is employed, can be "fine tuned" by selection of circuit elements and time delay adjustments to provide advantageous rotor position signaling within each step and closed loop operation over at least some speed ranges with virtually all types of stepping motors. Those skilled in the art may readily make trial and error adjustments to arrive at the necessary circuit constants, and to determine the speed or load operating ranges, which bring forth successful "on current" peak sensing.

It was mentioned earlier that peaks which appear in the "off currents" may also be sensed in applying the present peak detection methods and apparatus. The present invention is generic to sensing of phase current when the phase is either "on" or "off" in order to produce a signal indicating that the rotor has reached a predetermined position within each span of movement constituting a step. The latter approach has indeed been found more desirable and reliable for the reason that, in general, the "off current" peaks continue to be defined and reliably detectable over a much wider speed range, and indeed over essentially the entire operating speed range for most all types of step motors.

Accordingly, FIGS. 17 through 20 pertain to another embodiment of the present invention wherein "off currents" are sensed in order to provide output pulses produced to signify attainment of successive rotor positions and which are also used to derive feedback switching pulses in a closed loop system. In order to sense the "off currents", individual resistors $R_1$, $R_2$ and $R_3$ are connected respectively in the flyback paths for the phases A, B and C as shown in FIG. 17. These resistors will thus respectively have across them recurring voltage waveforms with frequencies equal to one-third of the phase switching frequency, and each of which is in its waveform shape similar to the waveform 45 previously described with reference to FIG. 4a. It will be assumed that the current-representing voltages for the three respective phases are designatable as $V_a$, $V_b$ and $V_c$, such voltages being substantially identical in their waveform shapes but being staggered or displaced in phase by 120°.

The peak detector 140 in FIG. 17 is formed as three separate phase peak detectors $PD_a$, $PD_b$, $PD_c$ respectively responsive to the voltages $V_a$, $V_b$, $V_c$. The details of the phase peak detector $PD_a$ are shown in FIG. 19, and the corresponding detectors $PD_b$ and $PD_c$ are identical. Recalling from curve 45 in FIG. 4a the shape of the "off current" for phase A, the recurring waveform for the voltage $V_a$ of FIG. 17 appears as represented at 141 in FIG. 20, recognizing that if the lower end of the resistor $R_1$ is taken as a reference point, the voltage $V_a$ is negative other than when it is zero. Thus, as represented by curve 141 in FIG. 20, the voltage $V_a$ is negative during the $B_{on}$ and the $C_{on}$ intervals, initially having a negative peak at 141a, then rising with a positive slope to a minimum negative (maximum positive) peak at 141c; thereafter falling with a negative slope to a maximum negative peak at 141b; and thereafter rising with a positive slope until it returns to zero at the instant when the A phase is again turned on.

The peak detector $PD_a$ shown in detail in FIG. 19 receives the voltage $V_a$ via a buffer amplifier 142 and transmits it to a slope detector 144 which may be any suitable differentiator and comparator or other slope detector circuit. The output voltage $V_4$ of the slope detector 144 thus appears in the form shown by a curve 145 (FIG. 20), being initially positive and falling to zero at the instant $t_1$ when the peak 141c appears during the $B_{on}$ interval. During the $C_{on}$ interval, the voltage $V_4$ remains negative until it again crosses zero at an instant $t_2$ which is coincident in time with the peak 141b. Then, the voltage $V_4$ swings positive for a short time until the A phase is turned on again at instant $t_3$.

The voltage $V_4$ is fed to a zero magnitude detector which in the arrangement illustrated by FIG. 19 is actually a negative polarity sensor. The latter is constituted by a high gain, open loop operational amplifier or voltage comparator 146 receiving the voltage $V_4$ on its inverting input, and having its non-inverting input terminal connected to a small negative biasing source 148. Thus, the output of the amplifier 146 is biased to a full or saturated negative value at all times except when the signal $V_4$ at the inverting input swings negative to a magnitude which exceeds the bias voltage BV from the source 148. As represented by a square waveform 149 in FIG. 20, therefore, the amplifier output voltage $V_5$ is at a low or negative "0" value at all times except when voltage $V_4$ falls below the bias level BV, and this occurs at the instant $t_4$ to make $V_5$ switch to a positive or "1" level. Thereafter the voltage $V_4$ rises above the bias BV at the instant $t_5$, and the voltage $V_5$ switches back to a negative or "0" level.

For each negative minimum peak 141c in the recurring waveform of voltage $V_a$, therefore, a squarewave is produced in the voltage $V_5$ with its leading edge having a predetermined time relationship to the instant $t_1$ at which the peak occurs when the motor rotor is at a predetermined position within each step.

With the voltage $V_5$ applied to a differentiator 150 (FIG. 19), the output of the latter is a pulse train 151 (FIG. 20) here designated as the voltage $V_6$, there being a positive pulse 151a at the instant $t_4$ and a negative pulse 151b at the instant $t_5$. The pulse 151a is in predetermined time relative to the current peak at 141c, a slight lag T being introduced by the biasing voltage BV. As will appear hereinafter, the negative pulses 151b in the pulse train 151 have no effect on subsequent circuit elements, so that the pulses 151a may be viewed as signals confirming each of the A phase "off current" peaks 141c.

Of course, as the motor continues to step c.c.w. successively, the pulses 151a will recur each time the A phase is turned off and during the subsequent switching cycle, i.e., during the following $B_{on}$ interval. Similar pulses will be produced by the B and C detectors $PD_b$ and $PD_c$, as a result of corresponding peaks in the B and C "off" currents. These latter pulses resulting from detection of peaks in B and C "off currents" will appear during the $C_{on}$ and $A_{on}$ intervals, respectively. This is illustrated in FIG. 18 where the $A_{on}$, $B_{on}$ and $C_{on}$ switching control voltages are represented at 30, 31, 32; the current-representing voltages $V_a$, $V_b$, $V_c$ are represented by curves 155, 156, 157; and the peak-responsive output pulses from A, B and C "off currents" are shown as pulses $OP_a$, $OP_b$ and $OP_c$.

It will be recalled that in FIG. 13, the "on currents" for all three motor phases are sensed by a single resistor $R_o$. This is feasible because the respective "on currents" occur sequentially and do not overlap in time. It will be apparent from FIG. 18, however, that the respective phase "off currents" partially overlap in time, and if they were all passed through a single pickup device, the output of the latter would represent the sums of those off currents which exist simultaneously. It is for this reason that the "off currents" for the three respective phases are shown as being sensed by the three individual resistors $R_1$, $R_2$, $R_3$ in FIG. 17. Yet, in order to permit the controlled step motor to be operated either in a c.c.w. or c.w. direction, it is necessary to select and utilize the proper one of the output pulses $OP_a$, $OP_b$ or $OP_c$ to be used for deriving the next switching pulse applied to the sequencer 18. This latter function is served by a routing multiplexer 160 shown generally in FIG. 17 and detailed in FIG. 19. Generally speaking, the multiplexer 160 is controlled so that it passes only the proper one of the output pulses $OP_a$, $OP_b$, $OP_c$ during a chosen one of the $A_{on}$, $B_{on}$ and $C_{on}$ intervals.

Referring more particularly to FIG. 19, the peak-representing pulses $OP_a$, $OP_b$, $OP_c$ are fed to respective AND gate 161, 162, 163 which are included within the multiplexer 160. The outputs of these gates connect to an OR circuit 164 leading to an output terminal 165. Each of the gates is controlled by a second input so that it is enabled during one of the three intervals $A_{on}$, $B_{on}$ and $C_{on}$, and as here shown this is accomplished by control connection from the outputs of the sequencer 18.

As illustrated in FIG. 17, the successive output pulses routed to the terminal 165 may be applied to utilization devices such as a counter 168 and a rate meter 169. But these same output pulses —each of which results from the occurrence of a phase "off current" peak—are also fed through a time delay device 88 to the input line 22 of the sequencer 18 so that the power switches $Q_a$, $Q_b$, $Q_c$ sequentially excite the phases A, B, C.

Greater detail is shown in FIG. 19, where the output pulses from terminal 165 are routed through the time delay device 88 to derive switching pulses S fed through the selector switch 25 in its CL position to the sequencer input line 22. Merely as a physical example suitable for discussion purposes, the details of the sequencer 18 are shown in FIG. 19, there being no attempt to illustrate a preferred, commercial form of the sequencer inasmuch as such devices are well known to those skilled in the art. As here shown, the sequencer is constituted by a reversible ring counter which includes flip-flops $FF_a$, $FF_b$, $FF_c$ connected in tandem via a direction selecting switch 170. In actual practice, the switch 170 would be formed by logic gate circuits responsive to a "0" or "1" control signal; but the mechanical switch here illustrated will facilitate an understanding of the operations which are involved. It is to be noted that the selector switch 170 comprises three ganged double throw switches 170a, 170b and 170c associated with the ring counter, and further includes double throw switches 170d, 170e, 170f which lead to the multiplexer 160. It is these switches which are generally represented by the control line 171 illustrated in FIG. 17 as supplying a controlling influence from the sequencer 18 to multiplexer 160.

Assume first that flip-flop $FF_a$ is in its set state and the flip-flops $FF_b$ and $FF_c$ are reset; and further assume that the switch 170 is in its c. c. w. position, as illustrated by FIG. 19. When an output pulse appears on the terminal 165 and passes through the delay device 88 to form a switch pulse S which appears on the input line 22, the flip-flop $FF_a$ will be reset, and the positive-going voltage transition at its $\overline{Q}$ terminal will pass through the switch 170a to set the flip-flop $FF_b$. The next such switching pulse will leave flip-flop $FF_a$ reset, but will switch the flip-flop $FF_b$ to its reset state, resulting in the positive voltage transition at its $\overline{Q}$ output terminal passing through the switch 170b to set flip-flop $FF_c$. Likewise, the next switching pulse will leave $FF_a$ and $FF_b$ reset, but will cause resetting of flip-flop $FF_c$ so that the positive voltage transition at its $\overline{Q}$ terminal will pass through the switch 170c to the setting input terminal of flip-flop $FF_a$—thereby again setting the latter to its "1" state. Thus, the three flip-flops $FF_a$, $FF_b$, $FF_c$ are sequentially switched to their "1" states in response to the sequential switching pulses appearing on the input line 122.

The Q output terminals of these flip-flops lead respectively to those conductors labeled $A_{on}$, $B_{on}$, $C_{on}$ and thus to the bases of the power switching transistors $Q_a$, $Q_b$, $Q_c$. Therefore, as the sequencing ring counter continuously operates and the three flip-flops are individually turned on in sequence, the motor phase windings A, B, C will be sequentially excited.

In these circumstances, a "1" level voltage will be supplied through the switch 170d from the Q output of flip-flop $FF_b$ to the gate 161 during those intervals when the B phase is excited, i.e., during the $B_{on}$ intervals. Likewise, the gate 162 will be enabled by a "1" level signal received through switch 170e during the $C_{on}$ intervals; and the gate 163 will be enabled through the switch 170f during the $A_{on}$ intervals when flip-flop $FF_a$ is in its "1" state. Referring to FIG. 18 for the moment, it will be seen that the phase A output pulse $OP_a$ is thus passed through the enabled gate 161 and the OR circuit 164 during the $B_{on}$ interval, i.e., during that time when the A phase has just been turned off and the B phase is on. Similarly, the output pulse $OP_b$ which occurs during the $C_{on}$ time will be transmitted to the output terminal 165 by the gate 162 which is enabled during the $C_{on}$ intervals.

Thus, the closed loop system responsive to "off current" minimum peaks as shown in FIGS. 17 and 19 will function in essentially the same manner previously described with reference to FIG. 13. The FIGS. 17–19 embodiment may be preferred in some specific applications because the peaks in the "off currents" remain well defined and reliably detectable over essentially the entire operating speed of the stepping motor. As indicated in FIG. 18, the phase A "off current" peak $OP_a$ occurs with a peak lead angle $\beta_p$ relative to the next following C equilibrium position $C_{eq}$. Generally speaking, the detection angle $\beta_p$ will be smaller for a system operating in the "off mode" than for a system operating in the "on mode" (compare FIGS. 18 and 4a) but the supplemental delay angle $\alpha_{td}$ can be made to convert the detection angle into a switching lead angle $\beta_s$ which makes the motor run at any desired speed. It is the A phase "off current" peak which causes the next turn-on of the C phase, whereas in the arrangement of FIG. 12 and FIG. 13 it is the detection of the A phase "on current" peak which causes the next turn-on of the B phase. In FIGS. 17 and 19, the time delay device 88 introduces a delay angle $\alpha_{td}$ of the desired magnitude so that the switching pulse derived from the peakrepresenting pulse $OP_a$ appears with a desired switching lead angle $\beta_s$ (here assumed for simplicity to be 1.5 steps) relative to the next following $C_{eq}$ position. When the switching pulse is applied to the sequencer 18, it results in the B phase being turned off and the C phase being turned on. Therefore, the phases of the motor are sequentially excited in the proper order and at those instants that the rotor is at the proper positions to make the motor operate reliably in a counterclockwise direction which results from the phases being excited in the A, B, C order.

If it is desired to operate the motor in the c.w. direction, however, the phases must be excited sequentially in the C, B, A order. It is only necessary to move the control switch 170 to the position opposite that illustrated in FIG. 19. Under these circumstances, when $FF_a$ is set in its "1" state, the appearance of a switching pulse on the line 22 will reset $FF_a$ (leaving $FF_b$ and $FF_c$ in their reset states) so that the positive-going voltage transition at its $\overline{Q}$ terminal will be passed through the switch 170a to the setting input of the flip-flop $FF_c$. Thus, $FF_a$ will be turned off and $FF_c$ will be turned on. The next input pulse on line 22 will reset flip-flop $FF_c$, and the voltage transition at its $\overline{Q}$ terminal will be passed through the switch 170c to set flip-flop $FF_b$. When the next input pulse resets flip-flop $FF_b$, the change in voltage at its $\overline{Q}$ terminal will be passed through the switch 170b to set flip-flop $FF_a$. Thus, the three flip-flops of the ring counter, the three power switching transistors $Q_a$, $Q_b$, $Q_c$, and the three winding phases A, B and C will be sequentially turned on in the C, B, A order — to make the motor step successively in a clockwise direction.

When the motor is so running, the off current peak-representing pulse $OP_a$ will appear in time during the $C_{on}$ intervals (rather than the $B_{on}$ intervals, as previously described). Likewise, the detection pulses $OP_b$ and $OP_c$ will occur during the $A_{on}$ and $B_{on}$ intervals, respectively. To be certain that these pulses are properly utilized to derive switching pulses, the switches 170d, e, f enable the gates 161, 162, 163 when the flip-flops $FF_c$, $FF_a$ and $FF_b$ are respectively in their set states. Thus, it is only the peak-representing pulse $OP_a$ which reaches the output terminal 165 during the $C_{on}$ intervals. Likewise, the phase peak-representing pulse $OP_b$ reaches the output terminal during the $A_{on}$ intervals, and the C phase peak pulse is passed during the $B_{on}$ intervals. As a result of this controlled gating in the multiplexer 160, the apparatus in FIG. 19 may be properly conditioned to control the stepping motor in either a c.c.w. or c.w. mode with closed loop pulse feedback.

Of course, one or more starting pulses may be injected into the system of FIG. 19 by momentarily placing the switch 25 in its OL position, then restoring it to the CL position. Centering the switch 25 will stop the system after it has been running in the closed loop mode. When power has been removed from the system, it is necessary to assure that one of the three flip-flops in the ring counter takes on a set state, and the other two are reset, at the time the voltage supply is turned on; but this is a detail which can be supplied by any person skilled in the art.

The system of FIGS. 17–19 "looks at" the current in a given phase during the switching interval immediately after the phase has been turned off. This may be called "first off" dissipation current sensing since, for example, the A phase current is utilized during the $B_{on}$ interval in the c.c.w. mode (or the $C_{on}$ interval in the c.w. mode). Yet, the invention may be practiced by timing connections such that the apparatus "looks at" a phase current during the second switching interval after turn-off, i.e., "second off" dissipation current. This would be the preferred arrangement for any particular motor which exhibits a pronounced, detectable characteristic (peak, slope flexure, threshold crossing or the like) in the "second off" intervals of the current waveform.

There may be certain applications in which it is desired to operate a given stepping motor with closed loop generation of switching pulses in either the "on" or "off" current sensing mode, and in either direction of rotation. Indeed, it may be useful in some cases automatically to change over from one of those modes to the other as the motor changes from one speed range to another, or as the torque load on the motor changes. FIG. 21 illustrates an embodiment of the invention in which such flexibility is realized.

So that it may respond to either "on" or "off" currents, the system of FIG. 21 utilizes resistors $R_{a1}$, $R_{b1}$, $R_{c1}$ as current-sensing pickup devices in series with the phases A, B, C and responsive to both excitation and dissipation current, as explained above with reference to FIG. 4. As the motor moves through each three successive steps, therefore, the current $I_a$ through resistor $R_{a1}$ has the recurring waveform illustrated at 36 in FIG. 4a, the frequency being one-third that of the switching frequency. The currents $I_b$ and $I_c$ for the B and C phases are essentially of the same waveform as $I_a$, but the three currents $I_a$, $I_b$, $I_c$ are displaced 120° in phase.

As shown in FIG. 21a, a peak detector is formed by three identical peak sensors $PS_a$, $PS_b$, $PS_c$ respectively coupled to receive the voltages $V_{a1}$, $V_{b1}$, $V_{c1}$ which appear at the lower ends of resistors $R_{a1}$, $R_{b1}$, $R_{c1}$. The details of the peak sensor $PS_a$ as here shown will suffice also for the sensors $PS_b$ and $PS_c$. As illustrated, the positive voltage bus 190 (which resides, for example, at +28 volts relative to ground) has a Zener diode 191 and a resistor 192 connected therefrom to ground, so that a reference line 194 extending from their junction resides at a constant voltage below (e.g., 15 volts below) the potential of the bus. For purposes of discussion, the line 194 may be viewed as an artificial ground. The voltage $V_{a1}$ may thus be viewed as being applied to the input of a differentiator formed by a capacitor 195 and a resistor 196 with its output connected to the non-inverting input of an operational amplifier 198 stabilized to have relatively low gain by a negative feedback resistor 199. In actual practice, the amplifier 198 may be a National Semiconductor type LM 3900 operational amplifier with the resistor 196 being constitituted by an internal diode poled forwardly from the non-inverting input to the supply line 194 and held conductive by a high resistor (not shown) connected from bus 190 to that input. In any event, the output $V_6$ of this amplifier varies as the time derivative of the voltage $V_{a1}$, although it is to be remembered that (i) $V_{a1}$ when viewed as the potential relative to ground at the input of capacitor 195 becomes less positive as the current $I_a$ increases, and (ii) the voltage $V_6$ varies between the dc. bias potentials of reference lines 194 and 190.

Thus, the waveforms of the current $I_a$ and the voltage $V_{a1}$ appear as shown at 36 and 200, respectively, in FIG. 22a in timed relation to the $A_{on}$, $B_{on}$ and $C_{on}$ intervals shown at 30, 31, 32. The differentiator 195, 196 makes the input to amplifier 198 and its output $V_6$ vary with the waveform 201 in FIG. 22a, crossing (from less to greater) a reference voltage $V_R$ at that instant when the "on current" maximum peak 38 in the current $I_a$ occurs, and crossing again (from greater to less) at that instant when the "off current" peak 40 occurs.

The peak sensor $PS_a$ responds uniquely to the "on" and "off" current peaks, which are reflected as a minimum at 200a and a maximum at 200b (FIG. 22) in the voltage $V_{a1}$. So long as the slope of the current $I_a$ is positive, the sensor output $C_a$ is low (logic "0") and so long as the slope of the current $I_a$ is negative, the output $C_a$ is high (logic "1"). Thus, the output signal $C_a$ has 0→1 and 1→0 transitions substantially at the instants that the peaks 38 and 40 respectively appear. To make this happen, the voltage $V_6$ is applied through an input resistor to the non-inverting input of an operational amplifier 204 employed as a comparator; and a reference voltage $V_R$ is picked from a potentiometer 205 for similar application to the inverting input. So long as $V_6$ is greater than $V_R$, the output $V_7$ of amplifier 204 will be high (about +28 volts) and whenever $V_6$ is less than $V_R$, the output $V_7$ will be low (about +13 volts). These two voltage levels prevent or create base-emitter current in a transistor $Q_5$, thereby cutting off or causing collector current to flow through a collector load resistor 206. A NOR gate 207 (having one input grounded) acts to invert the voltage across resistor 206, so that when the transistor $Q_5$ is cut off, the output signal $C_a$ is high (logic "1") and vice versa.

This operation will be apparent from FIG. 22a. When the current $I_a$ is rising (and voltage $V_{a1}$ is falling), the differentiated voltage $V_6$ is less than $V_R$— so transistor $Q_5$ is turned on, a voltage drop exists across resistor 206 to supply a "1" input to NOR gate 207, and thus make the output $C_a$ low (logic "0"). This condition exists at 208a in the waveform 208 representing the signal $C_a$ (FIG. 22a). On the other hand, when the current $I_a$ is falling (negative slope), the voltage $V_6$ is greater than $V_R$, transistor $Q_5$ is turned off, a "0" level signal exists across resistor 206, and the output $C_a$ is high (logic "1") as indicated at 208b. It is at the instant when the maximum current peak 38 appears that the output $C_a$ switches from 0 to 1, i.e., has the positive-going (0→1) transition labeled 208c.

It will be apparent, in similar fashion, that when the negative peak 40 in the current $I_a$ occurs, the output voltage $C_a$ undergoes a (1→0) transition, here labeled 208d. Thus, the peak sensor $PS_a$ produces an output $C_a$ containing information indicative of the "on" current peak 38 and the "off" current peak 40 in the phase A current $I_a$; these being respectively indicated by the 0→1 and 1→ transitions 208c and 208d. Due to the nature of the waveform 36 for the current $I_a$, the output signal $C_a$ contains other transitions (see the short pulse labeled 208e), but these are ignored by the timed logic circuits which respond to the signal $C_a$. It may be stated generally, the current $I_a$ contains one positive peak 38 during each switching interval when the A phase is turned on ($A_{on}$); and it contains a negative peak 40 during each switching interval ($B_{on}$, as shown) which immediately follows the $A_{on}$ interval.

The waveforms for the B and C phases (i.e., the currents $I_b$, $I_c$; the voltages $V_{b1}$, $V_{c1}$; and the counterparts of the A phase voltage $V_6$) are not shown in FIG. 22a, since it will be understood that they have essentially the same shapes but are separated by 120° phase angles from the waveforms 36, 200 and 201. Since the peak sensors $PS_b$ and $PS_c$ are identical to the sensor $PS_a$, their respective outputs $C_b$ and $C_c$ are shown at 209 and 210 in FIG. 22a ($C_a$, $C_b$ and $C_c$ being phase-separated by 120°) and it will be understood from the detailed explanation of sensor $PS_a$ how these latter signals are created.

For routing and multiplexing purposes, the apparatus of FIG. 21 includes means to produce logic signals representing the intervals when the A, B and C phases are respectively turned on. In this instance, the voltage drops across the switching transistors $Q_a$, $Q_b$, $Q_c$ are sensed by three respective and identical control circuits 214, 215, 216 characterized by their ability to be inhibited so as to temporarily disable the circuits (to be described) which produce switching pulses. A description of the control circuit 214 will suffice also for the identical circuits 215 and 216.

As here shown, the collector of power transistor $Q_a$ is connected to a voltage divider formed by resistors 218, 219 having their junction connected to one input of a NOR gate 220. The other input (labeled IH) to that gate resides at a "0" logic level except when inhibiting action is to occur, as hereinafter explained. Normally, therefore, when the $A_{on}$ signal exists and $Q_a$ is turned on to excite phase A, the potential at the collector of $Q_a$ will be very low (logic "0"), so that the NOR gate 220 produces an output signal $A'_{on}$ having a logic "1" level. When $Q_a$ is turned off, the potential at its collector is high, a "1" signal is supplied to NOR gate 220 from resistor 219, and the output $A'_{on}$ has a "0" level. Thus, the $A'_{on}$ signal is essentially a duplicate of the $A_{on}$ signal (when IH is at logic "0"). When, however, the input IH is at a logic "1" level, then the signal $A'_{on}$ is at a "1" level irrespective of whether phase A is on or off.

The present system, as stated above, permits the step motor to be operated in a closed loop fashion, but in response to sensing of either the "on" or the "off" phase current peaks. Moreover, the motor may be caused to run in either the c. c. w. of the c. w. direction. Three switches M1, M2, M3 (plus a direction switch M4) are here shown diagrammatically to illustrate a means to select the mode of operation, although those skilled in the art will recognize that similar logic switching may be performed in actual practice by solid state multiplex gating responsive to binary coded input control signals. The switches M1–M3 are shown in their deactuated states; the actuation of anyone of these will route the $A'_{on}$ $B'_{on}$ and $C'_{on}$ signals via a contact matrix 124 to different ones of the lower inputs $K_a$, $K_b$, $K_c$ of three AND gates 225a, 225b, 225c which respectively receive at their other inputs the signals $C_a$, $C_b$, $C_c$. Thus, for example, if switch M1 is actuated, its contacts will cause gates 225a, 225b, 225c to be enabled respectively by the A$'_{on}$, B$'_{on}$, C$'_{on}$ signals to pass the C$_a$, C$_b$, C$_c$ signals —the outputs of the gates leading to the inputs of a NOR circuit 228 producing an output signal labeled U. Moreover, the switch M4 is set to its actuated or deactuated state to supply a logic "1" voltage to terminal 18a or 18b of the sequencer to condition the latter (in well known fashion) to cause phase switching in an ABC or CBA sequence.

With the foregoing in mind, the following table will indicate the modes which may be selected and the control conditions which obtain:

| MODE | Switch Settings | | | | Gate Control Signals | | | RESPONSIVE | |
| --- | --- | --- | --- | --- | --- | --- | --- | --- | --- |
| | M1 | M2 | M3 | M4 | K$_a$ | K$_b$ | K$_c$ | MV 230 | MV 231 |
| "On" Current c.c.w. | X | | | | A$'_{on}$ | B$'_{on}$ | C$'_{on}$ | NO | YES |
| "On" Current c.w. | X | | | X | " | " | " | NO | YES |
| "Off" Current c.c.w. | | X | | | B$'_{on}$ | C$'_{on}$ | A$'_{on}$ | YES | NO |
| "Off" Current c.w. | | | X | X | C$'_{on}$ | A$'_{on}$ | B$'_{on}$ | YES | NO |

In essence, it will be seen that in the "on" current mode, a detected current peak in any phase current is transmitted during the interval that such phase is excited, and it results in the output signal U switching from a high to a low level essentially at the instant the peak appears. In contrast, in either "off" current mode, a detected minimum current peak in any phase current (resulting in a 1→0 transition in C$_a$, C$_b$ or C$_c$) is transmitted via the gates 225 and 228 to produce a low-to-high transition in the signal U—and this occurs in the "first off" switching interval which next follows the interval during which the phase was turned on. Since the unwanted transitions such as those at 208e (FIG. 22) show up in the "second off" interval, they have no effect on the signal U, as will become apparent.

The signal U is applied to each of two monostable multivibrators 230 and 231 which are respectively and complementally inhibited (and held in their reset states) by a control signal IH$_1$ applied to their $\bar{I}$ and I control terminals. The signal IH$_1$ is given a "0" or a "1" logic level by contacts of switch M1 when the system is respectively placed in the "off" or "on" current mode. Thus, multivibrator 230 is inhibited and held reset by a "1" level for signal IH$_1$ when the "on" mode exists; and multivibrator 231 is held reset by a "0" level for signal IH$_1$ when the "off" mode exists. The two multivibrators are designed such that 230 sets (if not inhibited) in response to a 0→1 transition in the signal U and such that 231 sets (if not inhibited) in response to a 1→0 transition in the signal U. Such multivibrator circuits are known to those skilled in the art.

Let it be assumed first that switch M1 is actuated and switch M4 is deactuated to select the "on c.c.w." mode. Multivibrator 230 is disabled, and its output remains at a "0" level. As phases A, B, C are excited in sequence, the signals C$_a$, C$_b$ and C$_c$ appear with the timing shown at 208, 209, 210 in FIG. 22a. Because gates 225a, 225b, 225c are enabled during the A$_{on}$, B$_{on}$, C$_{on}$ intervals, the output voltage U appears as shown at 234. Recalling that NOR circuit 228 inverts the output of the enabled gates 225a, 225b or 225c, the signal U has a 1→0 transition at 234a (when C$_a$ goes 0→1 at the instant of current peak 38), has a 0→1 transition at 234b when switching occurs, and then has another 1→0 transition when C$_b$ goes to a "1" level at 209a (as a result of a maximum peak in the current peak in the current I$_b$).

In response to each 1→0 transition in the voltage U, the multivibrator 231 is set, its $\bar{Q}$ output swings low, and then swings high after a predetermined time T$_1$, as shown at 235 in FIG. 22a. There is one such pulse in the waveform 235 for each of the "on" current peaks in each of the phase currents I$_a$, I$_b$, I$_c$. That signal is connected to the B input of a monostable multivibrator 238 (e.g., Texas Instruments Type SN 74121) which triggers in response to a B input low-high transition if its A input is then at a low level (such being the signal applied to A from the Q output of multivibrator 230). The $\bar{Q}$ output of the delay multivibrator 238 is shown at 239 in FIG. 22a; it falls from 1 to 0 and then restores after a selected delay time T$_2$. The $\bar{Q}$ output of multivibrator 238 being connected to the B input of a similar multivibrator 240 which is the inhibit monostable, the latter is set, and its Q output rises from 0 to 1 each time the delay multivibrator 238 resets, thereby producing an inhibit pulse of predetermined duration T$_3$, as shown at 241 in FIG. 22a.

This Q output of multivibrator 240 is coupled via line 242 to the IH inputs of control circuits 214–216 to inhibit spurious responses in the signal U during the period T$_3$ after each switching occurs. So long as the IH inputs are at a high level, the signals A$'_{on}$, B$'_{on}$ are held at "0", and the signal U must remain high. After the period T$_3$ ends, the signal U reverts to a "0" level when the next B phase current peak appears as indicated by the transition 209a.

Also, each time that the Q output of multivibrator 240 rises, it triggers a final output monostable multivibrator 244, the Q output of the latter thus being a series of final output pulses shown at 245 in FIG. 22a. These pulses are routed to a counter 246 and a rate meter 247 (to indicate motor displacement and velocity, as previously explained), and also to the input 22 of sequencer 18. Each of these output pulses 245 thus becomes a switching pulse to step the sequencer. As indicated in FIG. 22a, if the B$_{eq}$ rotor position is as labeled, and a switching angle $\beta_s$ (assumed for example to be 1.5 steps) is required, the current peak 38 may appear with a greater lead angle $\beta_p$. In the present instance, the sum of the multivibrator time intervals T$_1$ and T$_2$ create a supplemental lead angle, such that $\alpha_{td} = T_1 + T_2$ and $\beta_s = \beta_p - \alpha_{td}$. The desired delay and $\beta_{td}$ value may be obtained by selecting or adjusting the time-out period T$_2$ created by the delay multivibrator 238.

If the system of FIG. 21 is operated in the "on current, c.w." mode (by actuating switches M1 and M4), the operation will be exactly as described above, except that the phases will be excited in the CBA sequence.

The operation of the system in the "off current c.c.w." mode may next be considered, with the assumption that switch M2 is actuated and switches M1, M3, M4 are deactuated. A 1→0 transition appears in the peak sensor output signals C$_a$, C$_b$, C$_c$ each time a minimum off current peak appears in the current I$_a$, I$_b$, I$_c$ —for example, the transition 208d which corresponds to minimum peak 40 in the current $I_a$ as shown in FIG. 22a. In these circumstances, the signals $C_a$, $C_b$, $C_c$ pass through the respective gates 225a, 225b, 225c during the respective $B_{on}$, $C_{on}$ and $A_{on}$ time intervals. Therefore, as shown in FIG. 22b, the signal U has the timing represented at 234'. It swings from low to high at 234a' when the signal $C_a$ falls during $B_{on}$ intervals, or when the signal $C_b$ falls during $C_{on}$ intervals, or when the signal $C_c$ falls during $A_{on}$ intervals (and signal U restores to the low level each time inhibit multivibrator 240 times out). Recalling that the multivibrator 230 is now active (because the inhibit voltage $I_c$ is "0"), the Q output of 230 swings high at each instant signal U swings high, and then restores after a predetermined interval $T_{1a}$. This is represented at 235' in FIG. 22b. Being applied to the A input of delay multivibrator 238 (whose B input is held at a "0" level by multivibrator 231), the output from Q of 230 triggers multivibrator 238 when multivibrator 230 resets. The Q output of 238 thus swings low and restores to a "1" level after a delay $T_2$ (see 239' in FIG. 22b). The output at Q of 238 therefore triggers the inhibit multivibrator 240, so its Q terminal switches to a "1" level for a period $T_3$ (see 241'). As indicated above, this assures that all of the signals $A'_{on}$, $B'_{on}$, $C'_{on}$ are "0" and that the signal U (at 234') must remain at the "1" level until the $T_3$ period ends, whereupon signal U restores to "0". Also, the 0→1 transition at the start of each inhibit pulse 241' triggers output multivibrator 244, so that the latter produces final, delayed switching pulses shown at 245'.

If the next $C_{eq}$ position has the location shown in FIG. 22b, and if the required switching lead angle is $\beta_s$ equal to about 1.5 steps (for example), the pulse 245'a appears with a lead angle of $\beta_s$—despite the fact that it was the detection of the minimum peak 40 in current $I_a$ which resulted in the pulse 245'a. The peak 40 was detected with a peak lead angle $\beta_p$ relative to the next $C_{eq}$ position as a consequence of the A phase "off" current peak, but since this happens during the $B_{on}$ interval, the next sequencer action will be to turn off the B phase and turn on the C phase. Thus, the sum of the delays $T_{1a} + T_2$ results in a supplemental angle $\alpha_{td}$, and switching of B to C phase occurs with the required lead angle of $\beta_s = \beta_p - \alpha_{td}$.

As drawn in FIGS. 22a and 22b, the timing interval $T_2$ created by the multivibrator 238 is not of the same duration for "on mode" operation as for "off mode" operation. Compare waveforms 239 and 239'. This is so because it is assumed—by the frequency shown for the phase excitation voltages at 30, 31, 32—that the motor is running at the same speed in each case. Yet, it will be understood that the peak detection angle $\beta_p$ is not the same in the "on mode" as in the "off mode" since in the first case detection of the $I_a$ peak occurs fairly early in the $A_{on}$ interval and the B phase is to be turned on when the rotor is at a lead angle $\beta_s$ away from the next $B_{eq}$ position; whereas in the second case, detection of the $I_a$ minimum peak occurs late in the $B_{on}$ interval and the C phase is to be turned on next when the rotor is at a lead angle $\beta_s$ away from the next $C_{eq}$ position. Since the same $\beta_s$ value is required for operation at the same speed in the "on mode" and the "off mode", the value of the supplemental lead angle $\alpha_{td}$ must be greater in the former mode than the latter mode. But since, in either case, $\alpha_{td} = T_1 + T_2$ this can be accomplished, if desired, by adjusting the time constant in the multivibrator 238 to make $T_2$ longer in the "on mode" than in the "off mode". In actual practice, however, the duration of the interval $T_2$ need not necessarily be varied or adjusted; and converting the system from the "on mode" to the "off mode" will result in a reduction of the detection angle $\beta_p$ which (with the same $\alpha_{td}$) will reduce the lead angle $\beta_s$—thereby causing the stepping motor to run at a slower speed. It is actually possible to reduce the speed of the motor in the system of FIGS. 21a, b by converting it from the "on" to the "off" mode. Of course, within any mode, the speed of the motor may be varied and controlled by adjusting the time constant (by means of an interval rheostat, not shown) of multivibrator 238 so as to change $\alpha_{td}$ and change the lead angle $\beta_s$.

The closed loop system of FIG. 21 is started or stopped by manually setting or resetting a flip-flop 250 having its $\overline{Q}$ output connected to the A input terminal of the multivibrator 240. If a switch ST is momentarily closed to set flip-flop 250, that A input terminal is placed at a "0" level, and the 1→0 transition (when input terminal B is a "1" level) causes switching of the multivibrator 240 which causes multivibrator 244 to supply a starting pulse to the sequencer 18. The motor will then run, with each executed step in effect producing the next switching pulse, as described. When, however, a switch SP is momentarily closed to reset the flip-flop 250, the A terminal of multivibrator 240 is placed at a "1" level, and so the multivibrator will not respond to input signals on its terminal B. This breaks the loop and the motor will stop with one of its phases steadily excited.

From the foregoing explanation, the reader may readily visualize the operation of the FIG. 21 system in the "off current, c.w." mode which is obtained by actuating the switches M3 and M4. Of course, when the system is conditioned to run the motor in a c.w. direction, the counter 246 may be conditioned (by a logic signal applied thereto) to count its received pulses in a reverse sense to that when the motor is running in a c.c.w. direction. In this way, the accumulated count will represent total rotor displacement even if the directions are changed from time to time. The apparatus produces in that and the other modes switching pulses which appear with a proper lead angle but only in response to a detection from phase currents which confirms that the preceding step will with certainty be executed.

It may be noted that if there is a malfunction while the motor is running, for example, due to a sudden excessive torque load on the rotor, then when a given phase is excited the phase current waveform will differ radically from those which have here been shown. In that event, the motor will stop because the sequencer 18 will not receive further switching pulses. But in such event, the accumulated number in the counter will accurately represent the displacement of the rotor, since the latter will come to rest at the equilibrium position corresponding to the last executed full step.

The general illustration in FIG. 4 makes it clear that the phase currents in a stepping motor may be sensed by locating sensors, such as resistors, in various specific locations. The "on" or the "off" current for any given phase may be separately sensed; or both the "on" and the "off" current for any given phase may be sensed by a single resistor (see $R_{a1}$, $R_{b1}$, $R_{c1}$); and a single resistor ($R_o$) may serve as a pick-up for all three phase "on" currents. FIG. 23 is here presented to illustrate yet another sensing arrangement by which all three phase "off" currents may be sensed by a single pick-up resistor $R_d$. As shown, the flyback dissipation diodes $D_a$, $D_b$, $D_c$ lead from the lower ends of their respective phase windings A, B, C through a common series resistor $R_d$ to the positive supply voltage terminal. The phase A "off" current thus flows in the path indicated at $I_{oa}$. The voltage drop across the resistor is sensed by a detector 251 responsive to a particular characteristic (e.g., a peak, slope flexure or magnitude) which appears in the "off currents" when the motor reaches respectable positions within each step span. The output of the detector leads to a processor 252 which utilizes the detected signal in any desirable way. Although the dissipation currents of two phases will flow simultaneously through the resistor $R_d$, the resulting waveform may be discriminated to detect the instant that the motor rotor has reached a certain angular position in relation to the next equilibrium position.

The present invention brings to the art the discovery that methods and apparatus in various forms, exemplified by the different embodiments here described, may be created to produce signals from sensed phase currents and which confirm that a stepping motor rotor has reached certain successive angular positions. Such confirmation signals may be employed advantageously in a variety of utilization systems, including inter alia those here described for indicating accurately the displacement or velocity of the stepping motor, and those which provide all of the advantages of closed loop operation without a mechanically driven feedback device.

We claim:

1. The method of confirming that a plural phase stepping motor will reach an equilibrium position corresponding to steady excitation of a phase which has been turned on, said method comprising the steps of (a) sensing the current which flows through a phase, (b) detecting a change in the sign of the slope of said current with respect to time, and (c) producing an output signal in response to said detecting.

2. The method set forth in claim 1 wherein said step (b) is carried out by detecting a peak in the phase current while the phase is excited and turned on.

3. The method set forth in claim 1 wherein said step (b) is carried out by detecting a peak in the phase dissipation current after the phase has been turned off.

4. The method of confirming that a plural phase stepping motor has executed a step in a system wherein the respective phases are sequentially energized from a voltage source, said method comprising sensing the current flow through a given phase either during or immediately after the time it is energized, detecting a maximum or minimum peak in such current, and producing an output signal in predetermined time relation to the instant that the peak occurs.

5. The method of operating a plural phase stepping motor which comprises the steps of:
  (a) exciting a given phase,
  (b) sensing the current which flows through the phase,
  (c) detecting a peak in such current,
  (d) producing an output signal in timed relation to the detected peak,
  (e) utilizing said output signal to turn off the excited phase and turn on the next phase in sequence, and
  (f) repeating said steps (b) through (e) in successive cycles.

6. In the combination of a stepping motor having a rotor and a plurality of winding phases, with switch means for sequentially applying exciting voltage of constant magnitude to the respective phases, the improvement which comprises
  (a) means for producing a signal which varies in correspondence to the current in a given phase winding during either or both of the time intervals when it is, or after it is, excited, and
  (b) means responsive to said signal for creating an output when the signal undergoes a peak with a change in the sign of its slope, said output confirming that the rotor has reached a position displaced by a known amount from the equilibrium position of the given phase.

7. In combination with a stepping motor having a plurality of sequentially excited winding phases, means for sensing currents flowing in said phases, a detector coupled to said sensing means for producing an output signal in predetermined time relation to each instant that the current in a phase passes through a predetermined peak with a change in sign of slope, and a utilization device responsive to said output signals.

8. The combination set forth in claim 7, wherein said utilization device comprises means responsive to each of said output signals for initiating turn-off of an excited phase and turn-on of the next phase in the sequence.

9. The combination set forth in claim 7 wherein said utilization device is selected from the group consisting of (a) a counter and (b) a rate meter.

10. In combination with a stepping motor having a plurality of winding phases successively energized with voltage to cause successive stepping of its rotor, means for sensing currents flowing through said phases, and means responsive to said sensing means for producing an output signal which appears in predetermined time relationship to a predetermined peak in the normal recurring current waveform of each phase.

11. The combination set forth in claim 10 further including means responsive to each output signal and operative after a predetermined time delay from the instant of its occurrence for de-exciting the then-energized phase and exciting the next phase.

12. The combination set forth in claim 10 further including a counter coupled to respond to said output signals and whose contents are indicative of the total displacement of the rotor.

13. The combination set forth in claim 10 further including a rate meter coupled to respond to said output signals and thereby indicating the average velocity of the motor.

14. In combination,
  (a) stepping motor having
    (a1) a rotor,
    (a2) a stator,
    (a3) a plurality of windings grouped in a plurality of phases, and
    (a4) a flyback dissipation element paralleling each phase,
  (b) means for applying a source voltage sequentially to said phases to cause said rotor to step,
  (c) means for sensing current which flows through said phases during either one or both of their "on" or "off" periods, and
  (d) means responsive to said sensing means for producing an output pulse signal which begins in predetermined time relationship to a preselected peak in the normal current of each phase.

15. The combination set forth in claim 14 wherein said means (b) includes means for switching said source voltage from one phase to the next in response to each output pulse, whereby the motor is commanded to execute a given step after confirmation that the preceding step has been or will be executed.

16. In combination with a stepping motor having a plurality of sequentially excited winding phases, means for sensing the currents flowing in the phases during those time intervals that each phase is excited, and means responsive to said sensing means for producing a pulse signal in predetermined time relation to the instant at which the current in any phase reaches a maximum magnitude peak and begins to fall.

17. In combination with a stepping motor having a plurality of sequentially excited winding phases, means for sensing the current flowing in each phase during those time intervals that it is excited, and a detector responsive to said sensing means, said detector including means for producing an output signal in predetermined time relation to each instant at which the current in an excited phase reaches a maximum magnitude and begins to fall.

18. The combination set forth in claim 17 wherein said phases are connected in respective parallel paths which are sequentially completed to sequentially excite the phases, and said current sensing means comprises a pick-up device connected in common serially with all of said paths so as to respond to the current in any path.

19. The combination set forth in claim 17 wherein said phases are connected in respective parallel paths which are sequentially completed to sequentially excite the phases, and said current sensing means comprises a plurality of pick-up devices each respectively connected in one of said paths.

20. In combination with a stepping motor having a plurality of sequentially excited winding phases each paralleled with a flyback dissipation element, means for sensing the dissipation current flowing in each phase after its de-excitation, and a detector responsive to said sensing means, said detector including means for producing an output signal in predetermined time relation to each instant at which the dissipation current in a phase reaches a predetermined peak with a change in sign of slope.

21. The combination set forth in claim 20 wherein said current sensing means comprises a single pick-up device connected commonly in series with all of said dissipation elements.

22. The combination set forth in claim 20 wherein said current sensing means comprises a plurality of pick-up devices respectively connected in series with different ones of said dissipation elements, each series combination of a pick-up device and a flyback element being in parallel across one of said phases.

23. In combination with a stepping motor having a plurality of phases and a rotor, together with a sequencer for sequentially energizing said phases to cause the rotor to step successively, the improvement which comprises
 (a) means for sensing current flowing in a phase to produce a first corresponding current-representing signal,
 (b) means for differentiating said first signal to produce a second signal representing the time derivative of said current, and
 (c) means responsive to said second signal for producing an output signal each time the second signal changes polarity in a given direction.

24. In combination with a stepping motor having a plurality of winding phases and a sequencer for sequentially exciting such phases,
 (a) means for sensing current flowing in a phase to produce a first corresponding current-representing signal,
 (b) means responsive to said first signal for producing a second corresponding signal which is delayed by a predetermined time, and
 (c) means for comparing said first and second signals to produce an output substantially at those instants in time when the first two become equal, whereby each output confirms that the motor has reached a predetermined position within the span of a step.

25. In combination with a stepping motor having a plurality of winding phases successively excited to cause successive stepping of its rotor,
 means for producing a first signal which varies according to the current flowing in a phase,
 means for producing a second signal which is a substantial duplicate of, but delayed for a predetermined time from, said first signal, and
 means for producing an output pulse signal in substantially fixed time relationship to the instants at which said second signal becomes equal in magnitude to said first signal.

26. The combination set forth in claim 25, further characterized in that said first signal producing means includes means responsive to the phase current only during those intervals when the phase is excited and not responsive to any flyback dissipation current.

27. The combination set forth in claim 25, further characterized in that each of said phases is paralleled with a flyback dissipation element, and said first signal producing means includes means responsive to the phase current only during those intervals when dissipation current is flowing.

28. In combination with a stepping motor having a rotor, a stator, and a plurality of windings grouped in a plurality of phases,
 means for sequentially applying a source voltage to said phases to cause said rotor to step,
 means for producing a first signal which varies as the current which flows through a phase,
 means for periodically sampling said first signal and holding the sampled value thereof to create a second signal which generally varies as the first but with a predetermined delay interval, and
 comparator means for producing an output signal when a preselected one of said first and second signals rises in magnitude above the other of such signals, each output signal confirming that said rotor has reached a predetermined position within the span of a step.

29. In combination with a stepping motor having a rotor, a stator and a plurality of windings physically connected in a plurality of phases,
 a sequencer for connecting one phase at a time in sequence to a source voltage,
 means for producing a first voltage which varies as the current flowing in a phase, and which changes to and departs from successive peaks as the rotor reaches predetermined positions within the spans of successive steps,
 a clock for producing pulses at a predetermined periodicity, means responsive to each clock pulse for sampling and storing said first voltage to create second voltage which varies generally as the first but with a predetermined sampling delay, and means for producing an output pulse when a selected one of said first and second voltages become greater in magnitude that the other.

30. The combination set forth in claim 29 further including means responsive to each of said output pulses for causing said sequencer to disconnect the then-connected phase from, and to connect the next phase to, the source voltage.

31. In a system for operating a stepping motor having a plurality of phases and a sequencer responsive to switching pulses for exciting said phases in sequence, the combination comprising (a) means for producing a signal manifestation each time that a predetermined characteristic appears in the normal recurring phase current waveforms, and (b) means responsive to each such signal manifestation for actuating said sequencer to turn off the then-excited phase and turn on the next phase in sequence.

32. The combination set forth in claim 31 further including time delay means to create a predetermined time delay between the instant of each signal manifestation and the instant of the consequent actuation of said sequencer.

33. In control apparatus for operating a stepping motor having a plurality of winding phases and a rotor, the combination comprising (a) a sequencer including a plurality of power switch devices respectively in series with said phases and a voltage source, (b) means for sensing the currents which flow in the respective phases as a result of the respective power switch devices being closed one at a time in sequence, (c) means coupled to said sensing means for producing an output pulse each time that a sensed phase current goes through a predetermined characteristic, and (d) means responsive to each output pulse for opening the then-closed power switch and closing the next power switch in a predetermined sequence.

34. The combination set forth in claim 33 further characterized in that said means (d) includes a time delay element for delaying the response to each output pulse.

35. The combination set forth in claim 33 further characterized in that said means (b) and (c) include means responsive to currents which flow in said phases only during the periods when each respective phase is connected to said voltage source.

36. The combination set forth in claim 33 further characterized in that said means (b) includes a common current path carrying the current of all of the phases in sequence as said power switches are sequentially closed, and a current sensing element responsive to current flow in said path.

37. The combination set forth in claim 33 further characterized in that said means (b) includes a plurality of current sensing elements respectively responsive to the current which flows through one of said phases and its associated power switch when the latter is closed.

38. The combination set forth in claim 33 further characterized in that a plurality of flyback diodes are individually and respectively connected across said phases, and said means (b) includes one or more current sensing elements responsive to flyback dissipation currents which flow through said phases and their corresponding diodes.

39. The combination set forth in claim 33 further characterized in that said phases are connected in common to one terminal of said voltage source and individually through their respective power switches to the other terminal of said voltage source, and further including a plurality of flyback diodes respectively connected from the junction of each phase and its switch through a common path to said one terminal, and said means (b) includes a current sensing element responsive to current flow through said common path.

40. The combination set forth in claim 33 further characterized in that a plurality of flyback diodes are individually and respectively connected across said phases, and said means (b) includes a plurality of current sensing elements respectively responsive to flyback dissipation forward currents which flow through corresponding ones of said diodes.

41. The combination set forth in claim 33 further characterized in that a plurality of flyback dissipation elements are individually and respectively connected across said phases, and said means (b) includes a plurality of current sensing elements respectively in series with said phases, each of said current sensing elements being disposed to carry the current which flows from said voltage source and the flyback dissipation current through the associated phase.

42. The combination set forth in claim 33 further characterized in that said means (c) includes means for producing an output pulse in timed relation to the appearance of said predetermined characteristic in a phase current during the intervals that the particular phase conducting such current is excited by closure of the associated power switch device.

43. The combination set forth in claim 33 further characterized in that said means (c) includes means for producing an output pulse in timed relation to the appearance of said predetermined characteristic in a phase current during those switching intervals which immediately follow the intervals that the particular phase conducting such current has been excited by closure of the associated power switch device.

44. The method of determining that the rotor of a plural phase stepping motor has reached a given position in traveling the span of one step, said method comprising (a) sensing the currents which flow through the phases, (b) detecting a characteristic which appears repetitively in the current waveforms in relation to a particular rotor position within the span of repetitive rotor steps, (c) producing an output signal in response to each such detection, and (d) utilizing said output signal to cause turn-off of the then-energized motor phases and turn-on of the next set of motor phases.

45. The method set forth in claim 44 wherein said characteristic is a change in the sign of the slope of current with respect to time.

46. The method set forth in claim 44 wherein said step (b) includes detecting a characteristic in the current waveform of a phase during a particular one of the successive switching intervals during which different phases of the motor are energized.

47. The method set forth in claim 46 wherein said particular one of the switching intervals is the interval during which that phase is energized.

48. The method set forth in claim 46 wherein said particular one of the switching intervals is the interval which immediately follows that during which the phase is energized.

49. In combination of a stepping motor having a rotor and a plurality of winding phases; with switch means for sequentially exciting said phases in different combinations, the improvement which comprises
   (a) means for producing a first signal which varies in predetermined relationship to the waveform of current which flows in a phase,
   (b) means responsive to said first signal for detecting a shape characteristic other than magnitude which repetitively appears in said waveform, and
   (c) means responsive to (b) for producing an output signal in predetermined time relationship to the instants at which each detection occurs,
whereby the output signal designates that the motor rotor has reached a given position in its travel through the span of a step.

50. In the combination of a plural phase stepping motor having a rotor, with switch means for exciting the phases in different combinations in a repeating sequence, the improvement which comprises
   (a) means for producing recurring signals which vary in predetermined relationship to waveforms of current which flow in the phases,
   (b) means responsive to said recurring signals for detecting the repetitive appearances of a predetermined shape characteristic other than magnitide in said waveforms, and
   (c) means responsive to (b) for producing an output signal in predetermined time relationship to the instants when each detection occurs, and
   (d) a utilization device responsive to said output signals.

51. The combination set forth in claim 50 wherein said means (c) is responsive to produce an output signal corresponding to a given phase only in response to detection by said means (b) during those ones of cyclically repeating switching intervals during which the given phase is excited.

52. The combination set forth in claim 50 wherein said means (c) is responsive to produce an output signal corresponding to a given phase only during one of those cyclically repeating switching intervals during which the given phase is turned off.

53. The combination set forth in claim 50 wherein said utilization device includes means responsive to said output signals for switching the energization of the motor phases in sequence.

54. In control apparatus for operating a stepping motor having a plurality of winding phases and a rotor, the combination comprising
   (a) a sequencer including a plurality of power switch devices respectively in series with said phases and a voltage source,
   (b) means for sensing the currents which flow in the respective phases as a result of the respective power switch devices being closed one at a time in sequence,
   (c) means coupled to said sensing means for producing an output pulse each time that a sensed phase current goes through a predetermined one of the peaks which appear in a phase current waveform, and
   (d) means responsive to each output pulse for opening the then-closed power switch and closing the next power switch in a predetermined sequence.

55. In the combination of a plural phase stepping motor having a rotor, with switch means for exciting the phases in different combinations in a repeating sequence, the improvement which comprises
   (a) means for producing recurring signals which vary instantaneously in proportion to the current which flows in the phases,
   (b) means for detecting the repetitive appearances of a predetermined peak in each cycle of said recurring signals,
   (c) means responsive to (b) for producing an output signal when each detection occurs, and
   (d) a utilization device responsive to said output signals.

* * * * *